(12) United States Patent
Nakajima et al.

(10) Patent No.: US 9,860,395 B2
(45) Date of Patent: Jan. 2, 2018

(54) DATA INPUT SYSTEM, DATA INPUT APPARATUS, DATA INPUT METHOD, AND NON-TRANSITORY COMPUTER-READABLE RECORDING MEDIUM ENCODED WITH DATA INPUT PROGRAM

(71) Applicant: KONICA MINOLTA, INC., Chiyoda-ku, Tokyo (JP)

(72) Inventors: Tomoaki Nakajima, Kobe (JP); Kazumi Sawayanagi, Itami (JP); Hisashi Uchida, Kyoto (JP); Atsushi Tamura, Amagasaki (JP); Toshimichi Iwai, Nara-ken (JP); Yuji Tanaka, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/004,647

(22) Filed: Jan. 22, 2016

(65) Prior Publication Data
US 2016/0227050 A1    Aug. 4, 2016

(30) Foreign Application Priority Data

Jan. 30, 2015    (JP) .................................. 2015-016942

(51) Int. Cl.
*H04N 1/00*    (2006.01)
*G02B 27/01*    (2006.01)

(52) U.S. Cl.
CPC ....... *H04N 1/00204* (2013.01); *G02B 27/017* (2013.01); *G02B 27/0172* (2013.01);
(Continued)

(58) Field of Classification Search
USPC ................. 358/1.1–3.29, 1.11–1.18
See application file for complete search history.

(56) References Cited

U.S. PATENT DOCUMENTS

| | | | | |
|---|---|---|---|---|
| 2012/0120224 A1* | 5/2012 | Zuest | ................. | G02B 21/0016 348/79 |
| 2012/0124509 A1* | 5/2012 | Matsuda | ................. | G06F 3/011 715/782 |
| 2014/0056475 A1* | 2/2014 | Jang | ......................... | G06K 9/18 382/103 |

FOREIGN PATENT DOCUMENTS

| | | | | |
|---|---|---|---|---|
| JP | 2010-218009 | * | 9/2010 | ............. G06F 13/00 |
| JP | 2010218009 A | | 9/2010 | |

(Continued)

*Primary Examiner* — Marcellus Augustin
(74) *Attorney, Agent, or Firm* — Holtz, Holtz & Volek PC

(57) ABSTRACT

A data input apparatus can communicate with an imaging unit capturing an image of a subject to output image data, and includes a display unit displaying a screen including data input areas, and a processor. The processor includes: a setting portion setting data input to the data input area; an instruction position acquiring portion acquiring an instruction position based on a relative position between a display surface of the display unit and a recording medium included in image data output by the imaging unit; an information acquiring portion acquiring information stored in the recording medium based on the image data; and an input information acquiring portion acquiring input information available for input to the data input area among the acquired information. If the acquired instruction position is a prescribed position, the setting portion sets the acquired input information as the data input to the data input area.

20 Claims, 19 Drawing Sheets

(52) U.S. Cl.
CPC ....... *H04N 1/0032* (2013.01); *H04N 1/00251* (2013.01); *G02B 2027/014* (2013.01); *G02B 2027/0138* (2013.01); *G02B 2027/0178* (2013.01); *G02B 2027/0187* (2013.01); *G06K 2209/01* (2013.01); *H04N 2201/006* (2013.01); *H04N 2201/0094* (2013.01)

(56) References Cited

FOREIGN PATENT DOCUMENTS

| JP | 2010-287079 | * 12/2010 | ............ G06Q 10/00 |
|----|----|----|----|
| JP | 2010287079 A | 12/2010 | |

* cited by examiner

DATA INPUT SYSTEM, DATA INPUT APPARATUS, DATA INPUT METHOD, AND NON-TRANSITORY COMPUTER-READABLE RECORDING MEDIUM ENCODED WITH DATA INPUT PROGRAM

This application is based on Japanese Patent Application No. 2015-016942 filed with Japan Patent Office on Jan. 30, 2015, the entire content of which is hereby incorporated by reference.

BACKGROUND OF THE INVENTION

Field of the Invention

The present invention relates to a data input system, a data input apparatus, a data input method, and a non-transitory computer-readable recording medium encoded with a data input program. More particularly, the present invention relates to a data input system which includes an imaging apparatus provided with an imaging function such as a camera, a data input method which is executed in the data input system, and a non-transitory computer-readable recording medium encoded with a data input program which is executed by the data input apparatus.

Description of the Related Art

In a business card and the like, there is described a name, an address and a contact number of an individual. There has been developed a technique of inputting information listed in the business card into a computer as electronic data. For example, Japanese Patent Laid-Open No. 2010-218009 describes an information processing apparatus characterized by comprising: an imaging means to capture an image of a medium which has access information recorded and is maintained by an operator; an access information detecting means to extract said access information from image information of said medium captured by said imaging means; and an access process executing means to, on the basis of the image information of the medium captured by said imaging means, detect that said medium is moved by said operator, and use the access information extracted by said access information detecting means so as to execute an access process in accordance with said detected movement of the medium, wherein: said access process executing means includes a UI generating means to, while displaying a monitor screen which displays the image information captured by said imaging means, on the basis of said extracted access information, generate a user interface (UI) indicating contents of said access process so as to display the generated UI in a surrounding area of said monitor screen; said monitor screen is used for guiding said operator to have said medium appeared within said monitor screen; and said access process executing means includes a gesture recognizing means to detect that said medium displayed in said monitor screen is moved by said operator in a direction of said UI selected by the operator, so as to select said access process, and an application activating means to cause an application to execute the access process selected by said gesture recognizing means.

However, a conventional information processing apparatus displays the captured image of a subject on the monitor screen, and the UI in a surrounding area of the monitor screen, and in the case where a medium as the subject moves, it is required to detect that a direction of the movement is in a direction to the UI displayed in a surrounding area of the monitor screen. Therefore, it is impossible to display another screen in the monitor screen. Since the application which executes the access process is previously determined from the access information extracted from the image information of the medium, there is a problem that the application should be defined for the information described in the medium. Therefore, this may cause problems that only a limited number of applications can be activated and usability is restricted.

SUMMARY OF THE INVENTION

According to an aspect of the present invention, a data input system includes a data input apparatus and an imaging apparatus capable of communicating with the data input apparatus, wherein: the imaging apparatus includes an imaging unit to capture an image of a subject and output image data of the captured image; the data input apparatus includes a display unit to display a screen including a data input area, and a processor. The processor includes a setting portion configured to set data input in the data input area. Either the processor included in the data input apparatus or the imaging apparatus further includes an instruction position detecting portion configured to, on the basis of a relative position between a display surface of the display unit and a recording medium both included in the image data output by the imaging unit, detect an instruction position within the display surface. Either the processor included in the data input apparatus or the imaging apparatus further includes an information detecting portion configured to detect information stored in the recording medium included in the image data output by the imaging unit. Either the processor included in the data input apparatus or the imaging apparatus further includes an input information extracting portion configured to extract from the detected information, input information that can be input to the data input area. The setting portion is configured to, in the case where the instruction position detected by the instruction position detecting portion is a prescribed position, set the extracted input information as data input to the data input area.

According to another aspect of the present invention, a data input apparatus is capable of communicating with an imaging apparatus including an imaging unit to capture an image of a subject and output image data of the captured image. The data input apparatus includes a display unit to display a screen including a data input area, and a processor. The processor includes: a setting portion configured to set data input in the data input area; an instruction position acquiring portion configured to acquire an instruction position detected within a display surface on the basis of a relative position between the display surface of the display unit and a recording medium both included in the image data output by the imaging unit, an information acquiring portion configured to acquire information detected on the basis of the image data and stored in the recording medium; and an input information acquiring portion configured to acquire input information being extracted from the acquired information and being able to be input to the data input area. The setting portion is configured to, in the case where the instruction position acquired by the instruction position acquiring portion is a prescribed position, set the acquired input information as data input to the data input area.

According to a further aspect of the present invention, a data input method performed in a data input system includes a data input apparatus and an imaging apparatus capable of communicating with the data input apparatus. The imaging apparatus includes an imaging unit to capture an image of a subject and output image data of the captured image. The data input apparatus includes a display unit to display a screen including a data input area. The data input method causes either the data input apparatus or the imaging apparatus to execute: an instruction position acquiring step of acquiring an instruction position detected within the display surface on the basis of a relative position between a display surface of the display unit and the recording medium both included in the image data output by the imaging unit; an information acquiring step of acquiring information detected on the basis of image data output by the imaging unit and stored in the recording medium; and an input information acquiring step of acquiring input information being extracted from the acquired information and being able to be input to the data input area. The data input method causes the data input apparatus to execute a setting step of, in the case where the instruction position acquired in the instruction position acquiring step is a prescribed position, setting the acquired input information as data input to the data input area.

According to a still further aspect of the present invention, a non-transitory computer-readable recording medium is encoded with a data input program executed by a computer controlling a data input apparatus capable of communicating with an imaging apparatus including an imaging unit to capture an image of a subject and output image data of the captured image. The data input apparatus includes a display unit to display a screen including a data input area. The data input program causes the computer to execute: an image data receiving step of receiving from the imaging apparatus image data output by the imaging unit; an instruction position detecting step of, on the basis of a relative position between a display surface of the display unit and the recording medium both included in the received image data, detecting an instruction position within the display surface; an information detecting step of, on the basis of the received image data, detecting information stored in the recording medium; an input information extracting step of, extracting from the detected information, input information able to be input to the data input area; and a setting step of, in the case where the instruction position detected in the instruction position detecting step is a prescribed position, setting the extracted input information as data input to the data input area.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
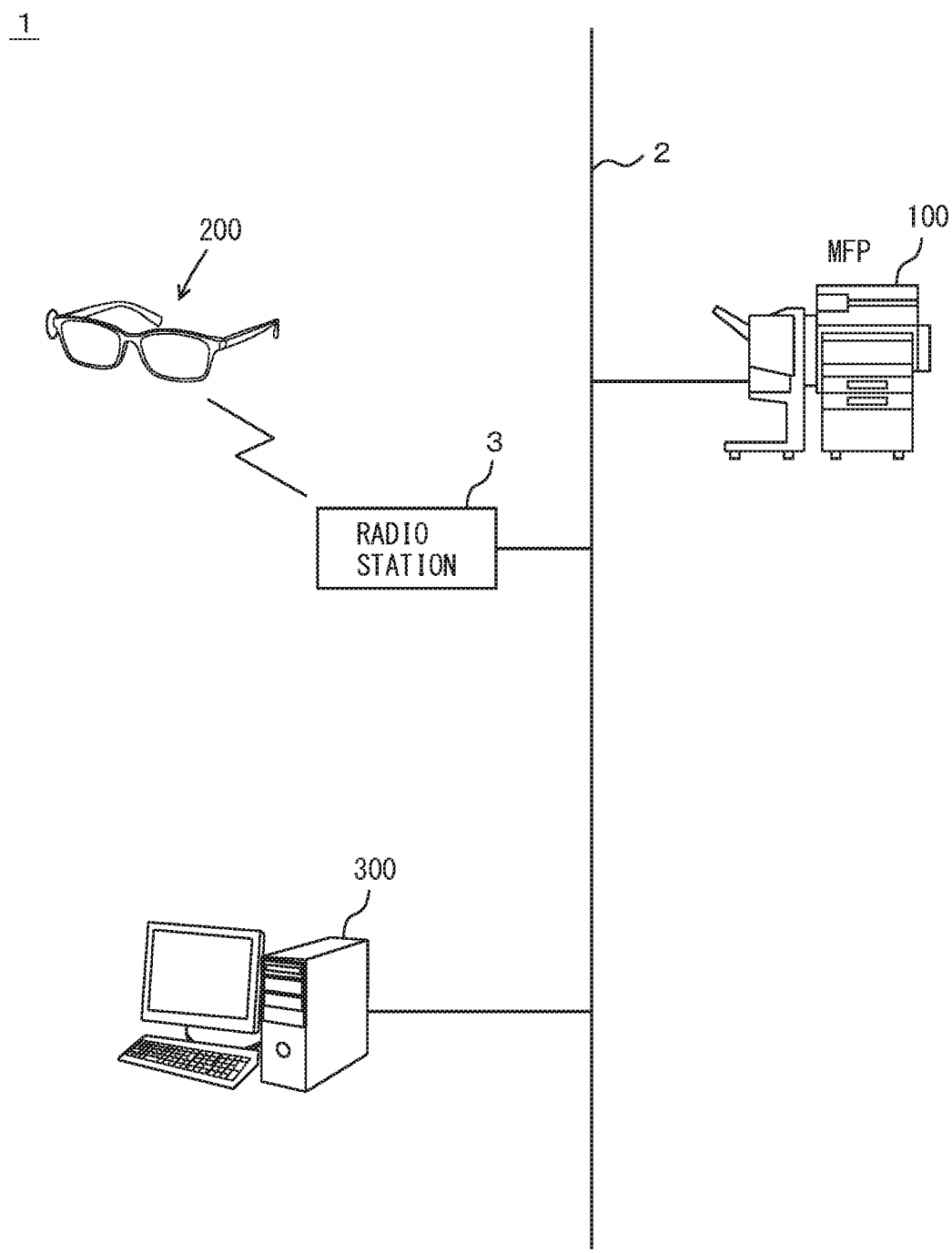
FIG. 1 is a diagram schematically showing an example of an entire overview of a data input system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 is a diagram schematically showing an example of an entire overview of a data input system according to an embodiment of the present invention. Referring to FIG. 1, a data input system 1 includes: a multi function peripheral (MFP) 100; a head mount display (hereinafter, referred to as an "HMD") 200; and a personal computer (hereinafter, referred to as a "PC") 300.

HMD 200 is shaped like a pair of eyeglasses and worn by a user for use. HMD 200 functions as an imaging apparatus, and at least includes an imaging function of capturing an image of a subject and a communication function using a wireless LAN. Further, HMD 200 includes a display function of displaying an image in part of lens of the eyeglasses, so that the user wearing HMD 200 can visually recognize the image displayed in the lens, simultaneously with visually recognizing the subject through the lens.

MFP 100 includes a document reading function of reading a document, an image forming function of forming an image on a medium such as paper based on image data, and a facsimile transmitting/receiving function of transmitting/receiving facsimile data.

PC 300 is a general computer, and a hardware configuration and functions thereof are publicly well known. Thus, a detailed description thereof will not be repeated.

Each of a radio station 3, MFP 100, and PC 300 is connected to a network 2. Network 2 is a Local Area Network (LAN), either wired or wireless. Network 2 is not limited to a LAN and may be a network such as a Public Switched Telephone Network (PSTN). Further, network 2 may be connected to a Wide Area Network (WAN) such as the Internet.

Further, network 2 may be connected to the Internet. In this case, each of radio station 3, MFP 100, and PC 300 can communicate with a computer connected to the Internet via network 2. Radio station 3 is a rely device in network 2, and communicates with HMD 200 including the communication function using a wireless LAN so as to connect HMD 200 to network 2. Therefore, HMD 200 can communicate with MFP 100 and PC 300 with each other.

It is here noted that HMD 200 may be replaced by a mobile information device carried by the user such as a Personal Digital Assistant (PDA), a smartphone and the like which have an imaging function of capturing an image of a subject, a display function of displaying an image, and a communication function using a wireless LAN.

Figure 2:
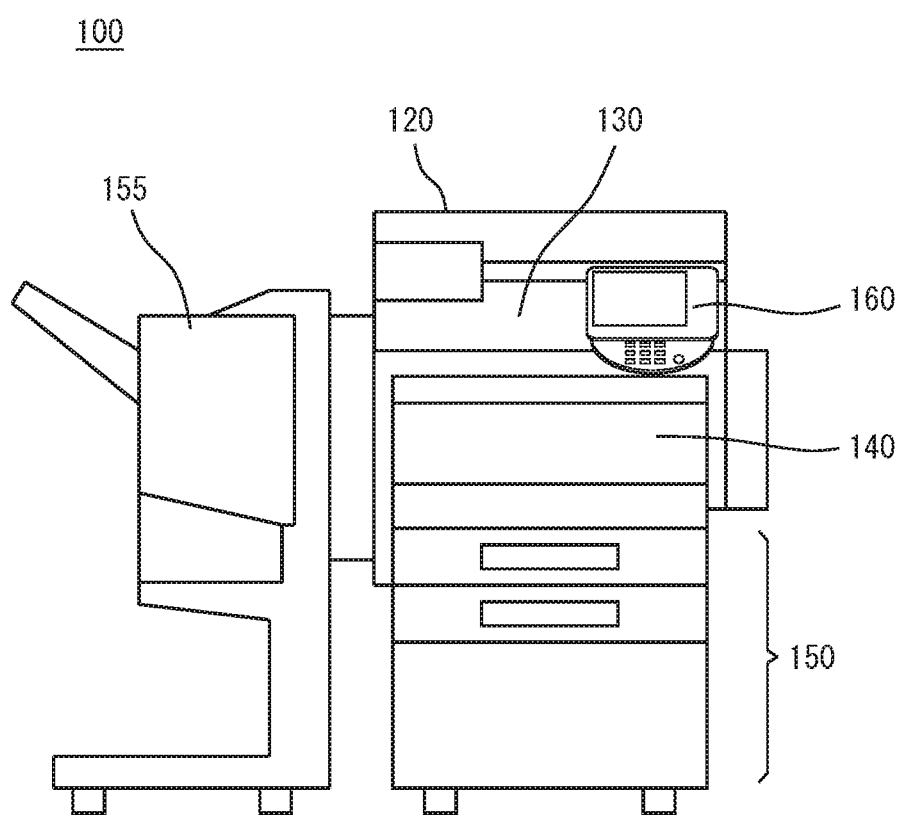
FIG. 2 is an external perspective view of an MFP according to the present embodiment.
Figure 3:
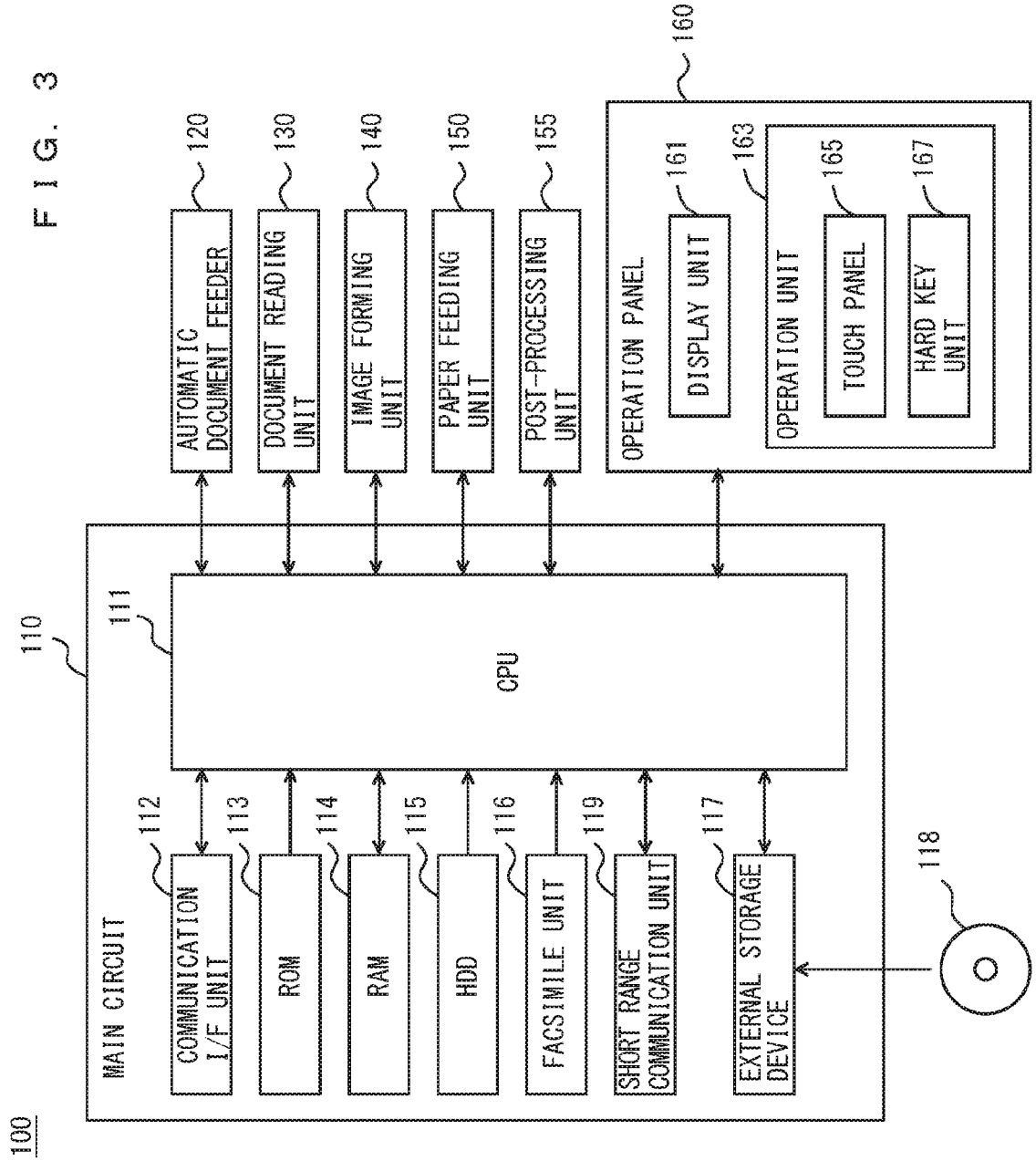
FIG. 3 is a block diagram showing an example of a hardware configuration of the MFP according to the present embodiment.

FIG. 2 is an external perspective view of an MFP according to the present embodiment. FIG. 3 is a block diagram showing an example of a hardware configuration of the MFP according to the present embodiment. Referring to FIGS. 2 and 3, MFP 100 includes: a main circuit 110; a document reading unit 130 for reading a document; an automatic document feeder 120 for feeding a document to document reading unit 130; an image forming unit 140 for forming an image on a sheet of paper or the like on the basis of image data output from document reading unit 130 that has read a document; a paper feeding unit 150 for supplying sheets of paper to image forming unit 140; a post-processing unit 155 which processes sheets of paper on which images have been formed; and an operation panel 160 serving as a user interface.

Post-processing unit 155 performs a sorting process of sorting and discharging one or more sheets of paper on which images have been formed by image forming unit 140, a hole-punching process of punching the sheets, and a stapling process of stapling the sheets.

Main circuit 110 includes a CPU 111, a communication interface (I/F) unit 112, a ROM 113, a RAM 114, a hard disk drive (HDD) 115 as a mass storage, a facsimile unit 116, and an external storage device 117 on which a CD-ROM 118 is mounted. CPU 111 is connected with automatic document feeder 120, document reading unit 130, image forming unit 140, paper feeding unit 150, post-processing unit 155, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading unit 130.

Operation panel 160, which is provided on an upper surface of MFP 100, includes a display unit 161 and an operation unit 163. Display unit 161 is a display such as a liquid crystal display (LCD) or an organic electro-luminescence display (ELD), and displays an instruction menu for the user, information about acquired image data, and others.

Operation unit 163 includes a hard key unit 167 having a plurality of keys, and accepts input data such as instructions, characters, and numerical characters, according to the key operations by the user. Operation unit 163 further includes a touch panel 165 disposed on display unit 161.

Communication I/F unit 112 is an interface for connecting MFP 100 to network 2. CPU 111 communicates with HMD 200 and PC 300 via communication I/F unit 112 for data transmission/reception. Further, communication I/F unit 112 can communicate with a computer connected to the Internet via network 2.

A short range communication unit 119 wirelessly communicates with HMD 200 on the basis of a Generic Access Profile (GAP) of the Bluetooth (registered trademark) standards. When a distance from HMD 200 falls within a range of a communicable distance, short range communication unit 119 communicates with HMD 200. The communicable distance for short range communication unit 119 is a few meters. Further, short range communication unit 119 may communicate through a short-range wireless communication system called NFC (Near Field Communication). In this case, the communicable distance for short range communication unit 119 is ten and a few centimeters.

Facsimile unit 116 is connected to public switched telephone networks (PSTN), and transmits facsimile data to or receives facsimile data from the PSTN. Facsimile unit 116 stores the received facsimile data into HDD 115, or outputs the data to image forming unit 140. Image forming unit 140 prints on a sheet of paper the facsimile data received by facsimile unit 116. Further, facsimile unit 116 converts the data stored in HDD 115 to facsimile data, and transmits the facsimile data to a facsimile machine connected to the PSTN.

External storage device 117 is mounted with CD-ROM (Compact Disk ROM) 118. CPU 111 is capable of accessing CD-ROM 118 via external storage device 117. CPU 111 loads a program stored in CD-ROM 118 which is mounted on external storage device 117, into RAM 114 for execution. It is noted that the medium for storing the program executed by CPU 111 is not restricted to CD-ROM 118. It may be an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

Further, the program executed by CPU 111 is not restricted to the program stored in CD-ROM 118, and CPU 111 may load a program stored in HDD 115, into RAM 114 for execution. In this case, another computer connected to network 2 may rewrite the program stored in HDD 115 of MFP 100, or may additionally write a new program therein. Further, MFP 100 may download a program from another computer connected to network 2, and store the program in HDD 115. As used herein, the "program" includes, not only the program which CPU 111 can execute directly, but also a source program, a compressed program, an encrypted program, and others.

Figure 4:
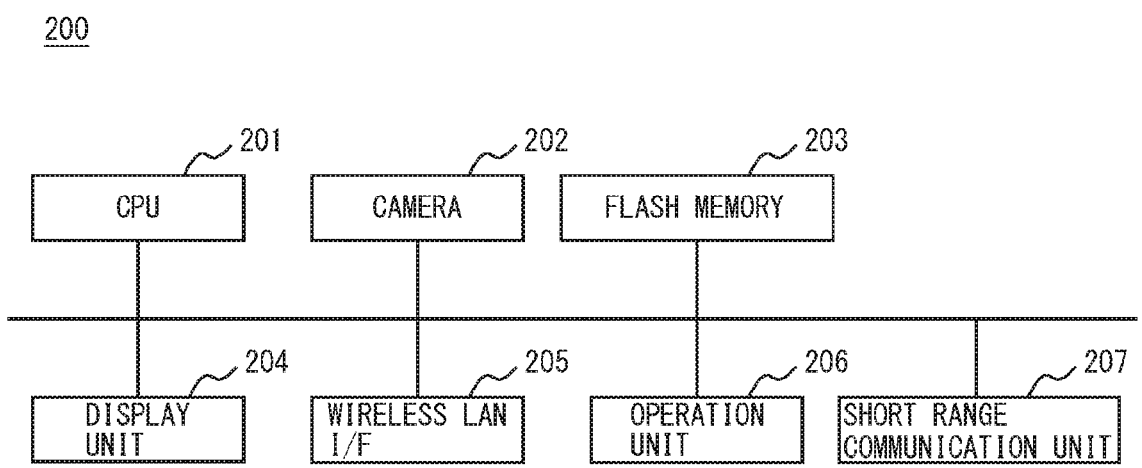
FIG. 4 is a block diagram showing an example of a hardware configuration of an HMD according to the present embodiment.

FIG. 4 a block diagram showing an example of a hardware configuration of an HMD according to the present embodiment. Referring to FIG. 4, HMD 200 according to the present embodiment includes: a CPU 201 which is responsible for overall control of HMD 200; a camera 202; a flash memory 203 which stores data in a nonvolatile manner; a display unit 204 which displays information; a wireless LAN I/F 205; an operation unit 206; and a short range communication unit 207.

Camera 202 includes a lens and a photoelectric transducer, light collected by the lens is imaged on the photoelectric transducer, and the photoelectric transducer photoelectrically converts the received light into image data for output to CPU 201. The photoelectric transducer may be a CMOS (Complementary Metal Oxide Semiconductor) sensor, a CCD (Charge Coupled Device), and the like. Camera 202 outputs image data of a moving image. It is here noted that HMD 200 may be replaced by a video camera which is capable of imaging a moving image.

Display unit 204 is a liquid crystal display (LCD) made of transparent components, and embedded in a surface of the lens of HMD 200. A display surface of display unit 204 is placed so as to be the same sight of the user who wears HMD 200. Therefore, an image can be displayed in an arbitrary position within the sight of the user. Camera 202 is arranged such that its optical axis and its imaging range are determined on the basis of the display surface of display unit 204. Specifically, the optical axis and the imaging range of camera 202 are set so as to be the same sight of the user who wears HMD 200. Therefore, an image captured by camera 202 is almost the same as an image of the sight that the user actually views.

Wireless LAN I/F 205 communicates with radio station 3, and is an interface for connecting HMD 200 to network 2. Wireless LAN I/F 205 registers in HMD 200 an Internet Protocol (IP) address of each of MFP 100 and PC 300 so as to be able to communicate with MFP 100 and PC 300 for transmission/reception of data.

Short range communication unit 207 wirelessly communicates with MFP 100 and PC 300 on the basis of a GAP of the Bluetooth (registered trademark) standards. When a distance from MFP 100 or PC 300 falls within a range of a communicable distance, short range communication unit 207 communicates with MFP 100 or PC 300. The communicable distance for short range communication unit 207 is a few meters. Further, short range communication unit 207 may communicate through a short-range wireless communication system called NFC. In this case, the communicable distance for short range communication unit 207 is ten and a few centimeters.

It is here noted that in the case where short range communication unit 207 becomes able to communicate with MFP 100 or PC 300, short range communication unit 207 may hand over the communication with MFP 100 or PC 300 to wireless LAN I/F 205. In this case, wireless LAN I/F 205 is not required to perform negotiations for establishing a communication path with MFP 100 or PC 300, and this facilitates the establishment of the communication path. HMD 200 may use either short range communication unit 207 or wireless LAN I/F 205 for communication.

Flash memory 203 stores a program executed by CPU 201 or data necessary for executing the program. CPU 201 loads the program stored in flash memory 203, into a RAM included in CPU 201 for execution. In this case, another computer connected to network 2 or the Internet may rewrite the program stored in flash memory 203, or may additionally write a new program therein. Further, HMD 200 may download a program from another computer connected to network 2 or the Internet, and store the program in flash memory 203. As used herein, the "program" includes, not only the program which CPU 201 can execute directly, but also a source program, a compressed program, an encrypted program, and others.

Operation unit 206 includes a microphone, collects by the microphone voice sound produced by the user, and recognizes the collected voice sound so as to accept an instruction from the user. For example, the name of a command corresponding to each of a plurality of operations is defined, and if there exists the same name of a command as character information acquired from the recognized voice sound, operation unit 206 accepts an operation which instructs execution of a command corresponding to the name of the command. Further, operation unit 206 accepts the character information acquired from the recognized voice sound, as an input value such as a character string and a numerical sequence. Further, operation unit 206 includes a sight line detecting sensor which detects a sight line of the user, and specifies from the sight line detected by the sight line detecting sensor and an image displayed in display unit 204, part that the user visually recognizes within the displayed image, so as to accept an operation of specifying a process target part. For example, operation unit 206 displays in display unit 204 an image of a button for accepting permission, and if the sight line detected by the sight line detecting sensor is on a position within the image of the button, operation unit 206 accepts an operation of designating by the user the button for accepting the permission.

Figure 5:
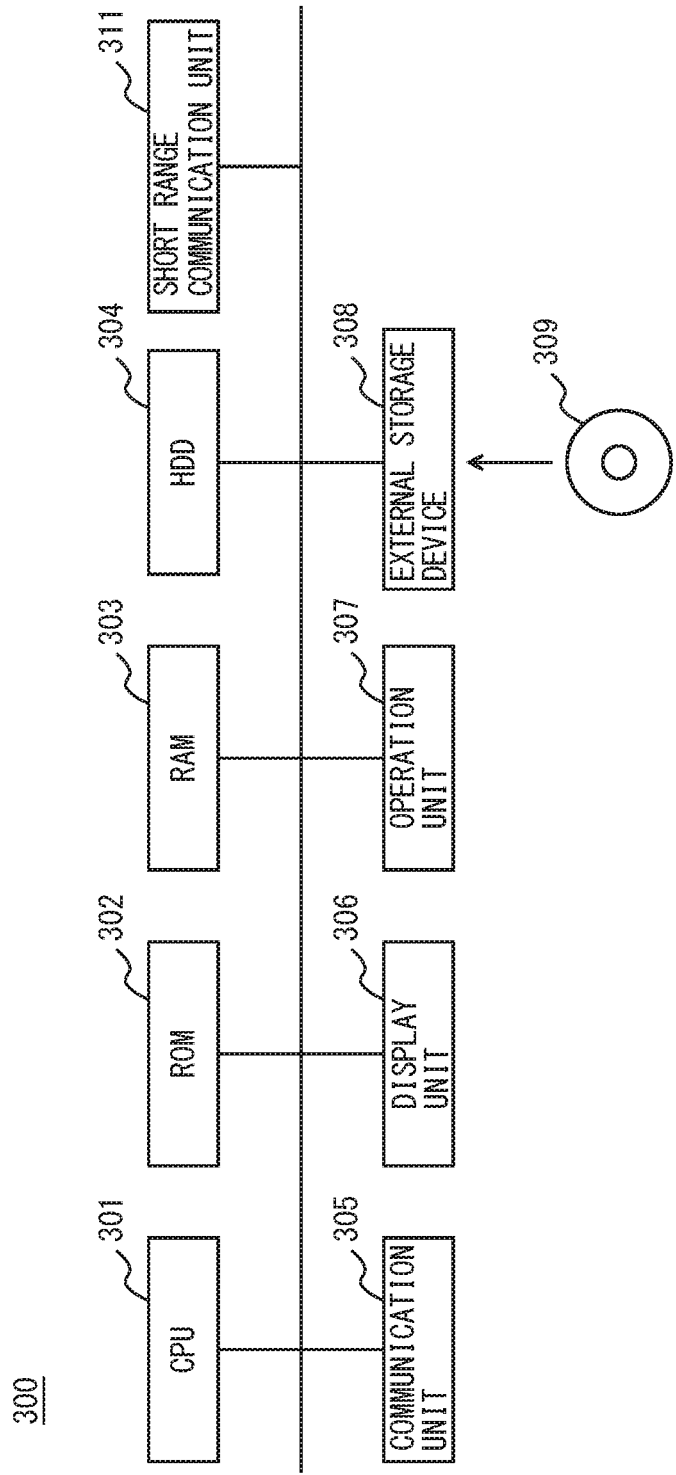
FIG. 5 is a block diagram showing an example of a hardware configuration of a PC according to the present embodiment.

FIG. 5 is a block diagram showing an example of a hardware configuration of a PC according to the present embodiment. Referring to FIG. 5, PC 300 includes: a CPU 301 which is responsible for overall control of PC 300; a ROM 302 which stores a program executed by CPU 301; a RAM 303 which is used as a work area for CPU 301; a HDD 304 which stores data in a non-volatile manner; a communication unit 305 which connects CPU 301 to network 2; a display unit 306 which displays information; an operation unit 307 which accepts operations by the user; an external storage device 308; and short range communication unit 311.

CPU 301 loads a program stored in ROM 302 or HDD 304, into RAM 302 for execution. CD-ROM 309 which stores a program is attachable to external storage device 308. CPU 301 can access CD-ROM 309 via external storage device 308. CPU 301 can load the program stored in CD-ROM 309, into RAM 302 for execution.

There has been described about the program stored in ROM 302, HDD 304 and CD-ROM 309 as the program executed by CPU 301, however, another computer connected to network 2 may rewrite the program stored in HDD 304, or may additionally write a new program therein. Further, CPU 301 may download a program from another computer connected to network 2. As used herein, the "program" includes, not only the program which CPU 301 can execute directly, but also a source program, a compressed program, an encrypted program, and others.

It is noted that the medium for storing the program executed by CPU 301 is not restricted to CD-ROM 309, but may be an optical disc (MO/MD/DVD), an IC card, an optical card, or a semiconductor memory such as a mask ROM, an EPROM, an EEPROM, or the like.

Short range communication unit 311 wirelessly communicates with HMD 200 on the basis of a GAP of the Bluetooth (registered trademark) standards. When a distance from HMD 200 falls within a range of a communicable distance, short range communication unit 311 communicates with HMD 200. The communicable distance for short range communication unit 311 is a few meters. Further, short range communication unit 311 may communicate through a short-range wireless communication system called NFC. In this case, the communicable distance for short range communication unit 311 is ten and a few centimeters.

Data input system 1 according to the present embodiment facilitates an operation in which the user inputs information described in a recording medium into MFP 100. It is here assumed, by way of example, that a business card is used as the recording medium, in which a name, an address, a telephone number, a facsimile number and an electronic mail address are described. The user operates operation unit 163 included in MFP 100, so as to cause MFP 100 to execute an application program of managing destination information for each of users, and cause MFP 100 to display a destination input screen in operation panel 160. The destination input screen includes areas for inputting the name, the address, the telephone number, the facsimile number, and the electronic mail address of the user. The user visually recognizes the name, the address, the telephone number, the facsimile number, and the electronic mail address described in the business card, operates operation unit 163 so as to be able to input into MFP 100. However, it is required to operate operation unit 163 to input all of the information described in the business card, and this may cause an increase in the number of operation and input error. Data input system 1 according to the present embodiment can facilitate this input operation.

The input operation will be described in detail below. It is here assumed that the user puts on HMD 200, which communicates with MFP 100 when moving close to MFP 100 within a prescribed distance, and transmits an image captured by camera 202 to MFP 100.

Figure 6:
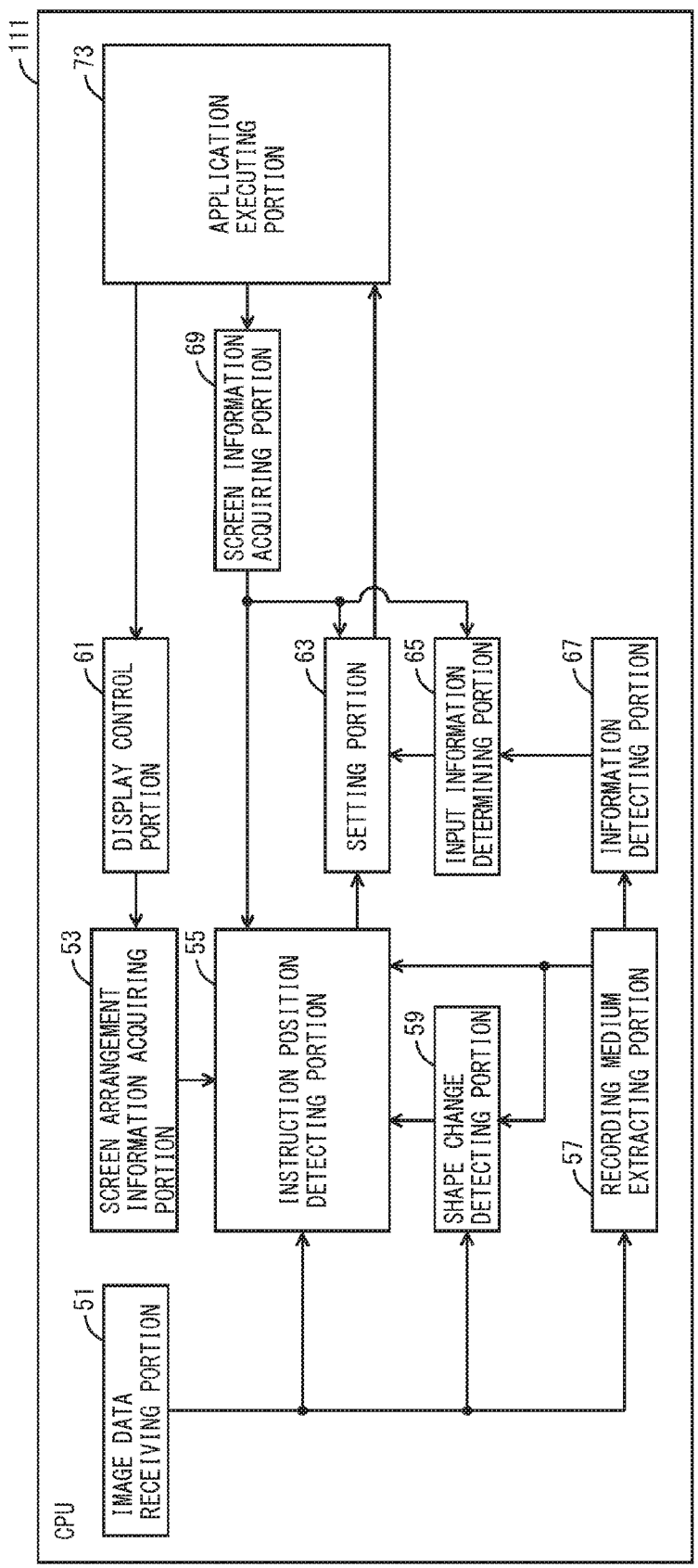
FIG. 6 is a diagram showing an example of functions of a CPU included in the MFP.

FIG. 6 is a diagram showing an example of functions of a CPU included in the MFP. The functions shown in FIG. 6 are formed in CPU 111 included in MFP 100 as CPU 111 executes a data input program stored in ROM 113, HDD 115, or CD-ROM 118. Each of the functions of CPU 111 shown in FIG. 6 is to execute a previously determined process for input, and output a process result. Therefore, each of the functions of CPU 111 can be performed in an electronic circuit using a relay and the like.

Referring to FIG. 6, CPU 111 includes: an image data receiving portion 51 which receives image data from HMD 200; a screen arrangement information acquiring portion 53; an instruction position detecting portion 55; a recording medium extracting portion 57; a shape change detecting portion 59; a display control portion 61 which controls display unit 161; a setting portion 63; an input information determining portion 65; an information detecting portion 67; a screen information acquiring portion 69; and an application executing portion 73.

In response to an event that the user operates operation unit 163 so as to select an application program and instruct execution thereof, application executing portion 73 causes CPU 111 to execute the application program. Application executing portion 73 is a task for CPU 111 to execute the application program. Application executing portion 73 outputs screen information to screen information acquiring portion 69, while outputting a screen to display control portion 61. The screen information includes screen identification information for identifying a corresponding screen, and area information. The area information includes, for each of one or more data input areas for input of data included in the screen, area identification information for identifying the data input area, area arrangement information which indicates a position of the data input area in the screen, and data definition information which defines data that can be input to the data input area. In the case where the data input area is rectangle-shaped, the area arrangement information may be represented by the coordinates of vertexes of two opposite angles of the data input area in the screen.

It is here assumed, by way of example, that CPU 111 executes one of application programs, that is, a control program for controlling MFP 100. More specifically, it will be described in detail about a process of managing the destination information, among processes executed by CPU 111 as CPU 111 executes the control program. The program of managing the destination information includes a process of registering the destination information input by the user. Application executing portion 73 executes the control program so as to output to display control portion 61 the destination input screen for input of the destination information and output to screen information acquiring portion 69 the screen information corresponding to the destination input screen. The destination input screen includes the data input area for inputting the name, the address, the telephone number, the facsimile number and the electronic mail address of the user to be registered. In this case, the screen information includes, in addition to the screen identification information of the destination input screen, the area arrangement information and the data definition information corresponding to each of the name, the address, the telephone number, the facsimile number and the electronic mail address. For example, the data definition information corresponding to the name includes: information indicating that the data relates to the name; attributes of characters; and the number of characters. The data definition information corresponding to the address includes: information indicating that the data relates to the address; attributes of characters; and the number of characters. The data definition information corresponding to the telephone number includes: information indicating that the data relates to the telephone number; attributes of the number; and the number of a numerical sequence. The data definition information corresponding to the facsimile number includes: information indicating that the data relates to the facsimile number; attributes of the number; and the number of a numerical sequence. The data definition information corresponding to the electronic mail address includes: information indicating that the data relates to the electronic mail address; attributes of characters; and the number of characters.

Display control portion 61 controls display unit 161, and in response to an event that a screen is input from application executing portion 73, display control portion 61 displays the screen in display unit 161. There may be the case where display control portion 61 displays a plurality of screens in display unit 161. In the case where display control portion 61 displays the plurality of screens in display unit 161, display control portion 61 sets one of the plurality of screens as a screen in a current state. Only the screen which is set as the current state becomes effective among the plurality of screens displayed in display unit 161, and an operation that the user inputs into operation unit 163 is accepted as an operation on the screen set as the current state. Display control portion 61 sets, on the basis of an instruction from application executing portion 73, one of the plurality of screens displayed in display unit 161, as a screen in the current state. Display control portion 61 displays the screen in the current state in a display manner different from another screen. The case where display control portion 61 displays the plurality of screen in display portion 161 may be the case where CPU 111 executes a plurality of application programs or the case where CPU 111 executes one application program and the plurality of screens are input from application executing portion 73. Every time display control portion 61 sets one of the plurality of screens as a screen in the current state, display control portion 61 outputs to screen arrangement information acquiring portion 53 the screen arrangement information of the screen in the current state. The screen arrangement information includes the screen identification information for identifying the screen and position information indicating a position on which the screen is arranged in a display surface of display unit 161. In the case where the screen is rectangle-shaped, the position information may be represented by the coordinates of vertexes of two opposite angles in the display surface. In the case where CPU 111 executes the plurality of application programs, the screen identification information includes application identification information for identifying the application program.

In response to an event that the screen arrangement information is input from display control portion 61, screen arrangement information acquiring portion 53 outputs the screen arrangement information to instruction position detecting portion 55.

In response to an event that the screen information is input from application executing portion 73, screen information acquiring portion 69 outputs the screen information to instruction position detecting portion 55, setting portion 63, and input information determining portion 65.

Image data receiving portion 51 controls short range communication unit 119 and/or communication I/F unit 112 so as to establish the communication path with HMD 200, and receive image data from HMD 200. HMD 200 will be described in detail later, however, HMD 200 establishes the communication path with MFP 100, and transmits image data captured by camera 202 to MFP 100. The image data transmitted by HMD 200 includes a moving image captured by imaging a subject. It is here noted that the moving image may be a still image which is captured at a prescribed time interval. The prescribed time interval may be an interval in which a movement of the user can be detected from differences between two images, for example, within one second. For example, when short range communication unit 119 or communication I/F unit 112 becomes able to communicate with HMD 200, image data receiving portion 51 receives the image data from HMD 200 via short range communication unit 119 or communication I/F unit 112. Further, when short range communication unit 119 becomes able to communicate with HMD 200, image data receiving portion 51 performs negotiations with HMD 200 so as to set for communicating with HMD 200 via communication I/F unit 112, and controls communication I/F unit 112 so as to establish the communication path with HMD 200. Then, image data receiving portion 51 receives the image data from HMD 200 via communication I/F portion 112. Image data receiving portion 51 outputs the image data received from HMD 200 to instruction position detecting portion 55, shape change detecting portion 59 and recording medium extracting portion 57.

Recording medium extracting portion 57 extracts from the image data an image of a recording medium. Recording medium extracting portion 57 outputs a pair of the image data and part of an image of the recording medium, to information detecting portion 67, shape change detecting portion 57, and instruction position detecting portion 55. Recording medium extracting portion 57 distinguishes a still part and a moving object part from two or more pieces of image data input from image data receiving portion 51 at different points of time, and extracts the moving object part as part including the image of the recording medium. The still parts are the same between the two images. Further, as HMD 200 is put on by the user, there may be the case where an optical axis of camera 202 moves. Therefore, recording medium extracting portion 57 extracts a plurality of characteristic points which are identical or similar between the two pieces of image data input from image data receiving portion 51 at different points of time, and moves the two images from right to left and up and down in order that the extracted plurality of characteristic points of the two images are overlapped with each other. Thus, this allows correcting misalignment of images caused by an event that the optical axis of camera 202 moves.

It is here assumed, by way of example, that the recording medium is a business card, and the user has the business card in hand. Therefore, aside from or in addition to extracting the moving object part from the image data, recording medium extracting portion 57 may extract from the image data, part of a hand or a finger of the user on the basis of characteristic points such as skin color of the finger and a shape of the fingernail, and extract as part of an image of the business card, an area which is overlapped with the extracted part of the finger. Further, in the case where the recording medium is the business card, recording medium extracting portion 57 may extract part of an image of the business card on the basis of characteristic points such as shape and color of the business card. For example, in the case where the business card is white colored, a white colored part of the image data may be extracted as part of the image of the business card.

Shape change detecting portion 59 receives the image data from image data receiving portion 51, and receives the pair of the image data and part of an image of the recording medium from recording medium extracting portion 57. Shape change detecting portion 59 detects change of a shape of the recording medium. After the pair of the image data and the part of an image of the recording medium is input from recording medium extracting portion 57, shape change detecting portion 59 uses the image data input from image data receiving portion 51 so as to detect the change of a shape of the recording medium. Specifically, shape change detecting portion 59 extracts, from the image data input from image data receiving portion 51, the same part as part of image data of the recording medium input from recording medium extracting portion 57, so as to compare the two parts. In the case where shapes of the two parts are different from each other, shape change detecting portion 59 detects the change of a shape of the recording medium. In response to detection of the change of a shape of the recording medium, shape change detecting portion 59 outputs to instruction position detecting portion 55 position information indicating a position of part of the changed shape in the image data input from image data receiving portion 51.

In the case where the user puts any one of four vertexes of the business card onto the display surface of display unit 161, a shape of the business card changes. As the business card is rectangle-shaped, the change of the shape of the business card is represented by any of the four vertexes. Since the image data input from image data receiving portion 51 is two-dimensional, shape change detecting portion 59 detects a vertex of a changed shape of the business card based on two of four edges of the business card, which change from straight line to curved line. Specifically, shape change detecting portion 59 determines as the vertex of a changed shape, part of a vertex angle formed by the changed two of four edges of the business card.

Information detecting portion 67 performs character recognition on part of the image of the recording medium in the image data so as to generate character information. Information detecting portion 67 outputs the generated character information to input information determining portion 65. Information detecting portion 67 uses the data definition information included in the screen information input from screen information acquiring portion 69, so as to recognize as characters a surrounding part including an image of characteristic characters defined by the data definition information, in part of the image of the recording medium. This makes it unnecessary to perform character recognition on the entire part of the image of the recording medium, and allows reducing the time of processing character recognition. It is here noted that, in the case where the user highlights an area in which data targeted for input is described, in color different from another part, only the highlighted data may be recognized as characters.

Input information determining portion 65 receives the character information from information detecting portion 67, and receives the screen information from screen information acquiring portion 69. Input information determining portion 65, on the basis of the area information included in the screen information, for each of data input areas, detects from the character information a part which is identical to a characteristic point defined by the data definition information corresponding to the data input area.

For example, the data definition information corresponding to the data input area for input of address includes: information indicating that the data relates to the address; attributes of characters; and the number of characters. Therefore, input information determining portion 65 determines as a character string corresponding to the address, part of a character string in the character information including characteristic characters included in the address. The characteristic characters included in the address include characters representing, for example, such as "province", "state", "prefecture", "county", "city", "town" and "village". Further, a part adjacent to characteristic characters such as "post code" and a symbol of the post code included in the address may be extracted.

The data definition information corresponding to the data input area for input of the name includes: information indicating that the data relates to the name; attributes of characters; and the number of characters. Therefore, input information determining portion 65 determines as a character string corresponding to the name, part of a character string excluding numerical characters and having equal to or less than the number of characters, in the character information. Further, since it is often the case where a character string of the name is described in larger size than another character strings in the business card, a character string described in larger size may be determined as the character string of the name.

The data definition information corresponding to the data input area for input of the telephone number includes: information indicating that the data relates to the telephone number; attributes of the number; and the number of numerical sequence. Therefore, input information determining portion 65 determines as a character string corresponding to the telephone number, part of a numerical sequence having the number identical to the number of numerical sequence in the character information. Further, since it is often the case where a numerical sequence of the telephone number is placed adjacent to a character string indicating the telephone number, such as "Telephone Number" and "Phone", part of a numerical sequence placed adjacent to above character string may be detected.

The data definition information corresponding to the data input area for input of the facsimile number includes: information indicating that the data relates to the facsimile number; attributes of the number; and the number of a numerical sequence. Therefore, input information determining portion 65 determines as a numerical sequence corresponding to the facsimile number, part of a numerical sequence having the number identical to the number of numerical sequence in the character information. Further, since it is often the case where a numerical sequence of the facsimile number is placed adjacent to a character string indicating the facsimile number, such as "Facsimile" and "FAX", part of a numerical sequence placed adjacent to above character string may be detected.

The data definition information corresponding to the data input area for input of the electronic mail address includes: information indicating that the data relates to the electronic mail address; attributes of characters; and the number of characters. Therefore, input information determining portion 65 determines as a character string corresponding to the electronic mail address, part of a character string or a numerical sequence including a characteristic character in the electronic mail address, such as "@". Further, since it is often the case where a character string of the electronic mail address is placed adjacent to a character string indicating the electronic mail address, such as "E-mail", part of a character string placed adjacent to above character string may be detected.

Input information determining portion 65 determines as the input data, part of the character information extracted for each of the data input areas, and outputs to setting portion 63 a pair of the area identification information of the data input area, the input data, and the screen identification information. In the case where the screen information includes a plurality of pieces of the area information respectively corresponding to each of the plurality of data input areas, input information determining portion 65 outputs to setting portion 63 the pair of the area identification information, the input data, and the screen identification information for each of the plurality of data input areas.

Instruction position detecting portion 55 receives the image data from image data receiving portion 51, receives the screen arrangement information of the screen in the current state from screen arrangement information acquiring portion 53, receives the screen information from screen information acquiring portion 69, and receives from recording medium extracting portion 57 a pair of the image data and part of the recording medium. In response to an event that the position information indicating a position of part of the changed shape is input from image data receiving portion 51, instruction position detecting portion 55 detects as an instruction position instructed by the user, a position specified by the position information input from shape change detecting portion 59, in the image data input from image data receiving portion 51.

In the case of detecting the instruction position, instruction position detecting portion 55 outputs a collective setting instruction to setting portion 63 in the case where the instruction position is within the screen in the current state specified by the screen arrangement information input from screen arrangement information acquiring portion 53. The collective setting instruction includes the screen identification information of the screen in the current state. Further, in the case of detecting the instruction position, instruction position detecting portion 55 determines whether the instruction position is within the data input area in the screen in the current state. Specifically, instruction position detecting portion 55 specifies the data input area in the screen in the current state, on the basis of the area arrangement information of the area information included in the screen information input from screen information acquiring portion 69. Then, in the case where the instruction position is within the screen in the current state in the image data, and within the data input area, instruction position detecting portion 55 outputs a separate setting instruction to setting portion 63. The separate setting instruction includes the screen identification information of the screen in the current state, and the area identification information of the specified data input area.

Setting portion 63 receives the screen information from screen information acquiring portion 69, and receives from instruction position detecting portion 55 the collective setting instruction or a pair of the collective setting instruction and the separate setting instruction. Setting portion 63 sets a setting mode to either a separate setting mode or a collective setting mode. Setting portion 63 sets to the collective setting mode in the case where display control portion 61 simultaneously displays a plurality of screens in display unit 161; whereas setting portion 63 sets to the separate setting mode in the case where display control portion 61 displays a single screen in display unit 161. Further, setting portion 63 sets the setting mode to either the collective setting mode or the separate setting mode, depending on the operation by the user. The user may set the setting mode in advance.

In the case where the setting mode is set to the separate setting mode, in response to an event that a separate setting instruction is input from instruction position detecting portion 55, setting portion 63 extracts from among the pairs of the area identification information, the input data and the screen identification information input from input information determining portion 65, a pair including the same screen identification information and area identification information as the screen identification information and area identification information included in the separate setting instruction, and setting portion 63 sets the input data on the basis of the extracted pair. Specifically, setting portion 63 sets the input data included in the extracted pair to the data input area of a screen specified by the screen identification information included in the pair, the data input area being specified by the area identification information included in the pair.

In the case where the setting mode is set to the collective setting mode, in response to an event that a collective setting instruction is input from instruction position detecting portion 55, setting portion 63 extracts from among the pairs of the area identification information, the input data and the screen identification information input from input information determining portion 65, all of pairs including the same screen identification information as the screen identification information included in the collective setting instruction, and setting portion 63 sets the input data on the basis of one or more pairs extracted. Specifically, setting portion 63 sets, for each of the one or more pairs extracted, the input data included in the pair to the data input area of a screen specified by the screen identification information included in the pair, the data input area being specified by the area identification information included in the pair.

Figure 7:
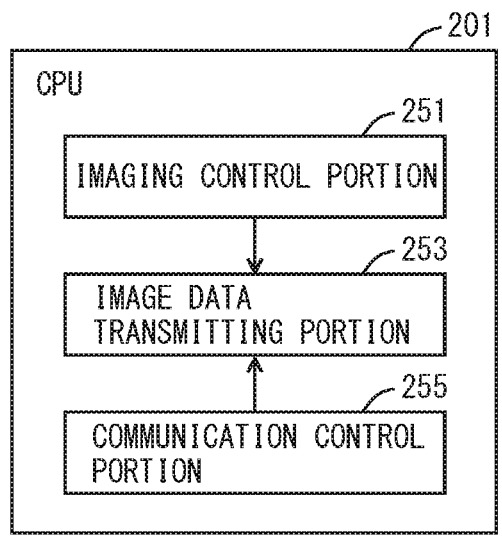
FIG. 7 is a diagram showing an example of functions of a CPU included in the HMD according to the present embodiment.

FIG. 7 is a diagram showing an example of functions of a CPU included in the HMD according to the present embodiment. The functions shown in FIG. 7 are formed in CPU 201 included in HMD 200 as CPU 201 executes a data input program stored in flash memory 203. Referring to FIG. 7, CPU 201 included in HMD 200 includes: an imaging control portion 251; an image data transmitting portion 253; and a communication control portion 255.

Imaging control portion 251 controls camera 202 so as to acquire the image data that camera 202 captures an image of a subject for output. In response to an event that operation unit 206 accepts an imaging instruction by the user, imaging control portion 251 causes camera 202 to capture the image of a subject. Imaging control portion 251 outputs the image data output by camera 202 to image data transmitting portion 253. In the case where camera 202 designates as the subject, display unit 161 included in MFP 100 and the business card, the image data output by camera 202 includes an image of display unit 161 and an image of the business card.

In response to an event that short range communication unit 207 becomes able to communicate with MFP 100, communication control portion 255 performs negotiations with MFP 100 so as to set for communicating with MFP 100 via wireless LAN I/F unit 205, and controls wireless LAN I/F unit 205 so as to establish the communication path with MFP 100. In response to establishment of the communication path with MFP 100, communication control portion 255 outputs to image data transmitting portion 253 path identification information for identifying the communication path. Further, communication control portion 255 may control short range communication unit 207 or wireless LAN I/F 205 so as to establish the communication path with MFP 100.

In response to an event that the path identification information is input from communication control portion 255, image data transmitting portion 253 controls wireless LAN I/F 205 so as to transmit to MFP 100 the image data input from image control portion 251.

Figure 8:
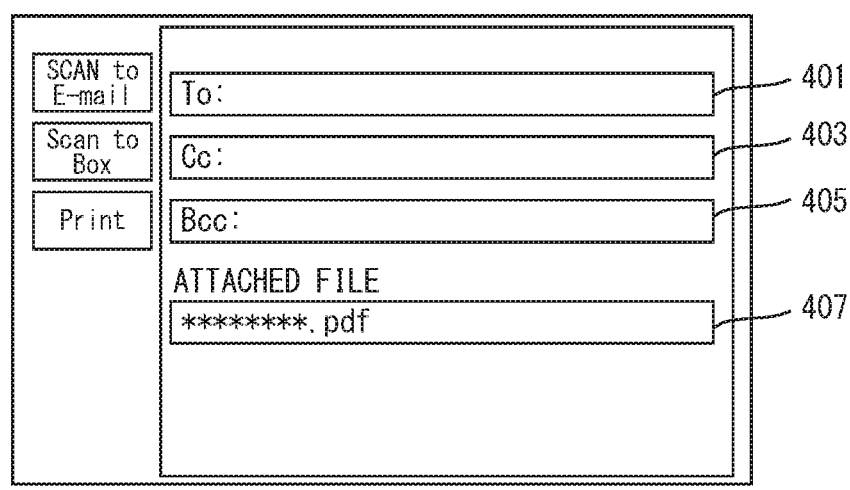
FIG. 8 is a diagram showing an example of an operation screen displayed in the MFP.

FIG. 8 is a diagram showing an example of an operation screen displayed in the MFP. Referring to FIG. 8, a setting screen for transmitting an electronic mail is displayed in an operation screen 400. The operation screen 400 includes four data input areas, 401, 403, 405 and 407. A data input area 401 is an area for input of an electronic mail address of a transmission destination. A data input area 403 is an area for input of an address of the transmission destination to which an electronic mail is transmitted in a carbon copy mode. A data input area 405 is an area for input of an address of the transmission destination to which an electronic mail is transmitted in a blind carbon copy mode. A data input area 407 is an area for input of the name of a file attached to the electronic mail.

Figure 9:
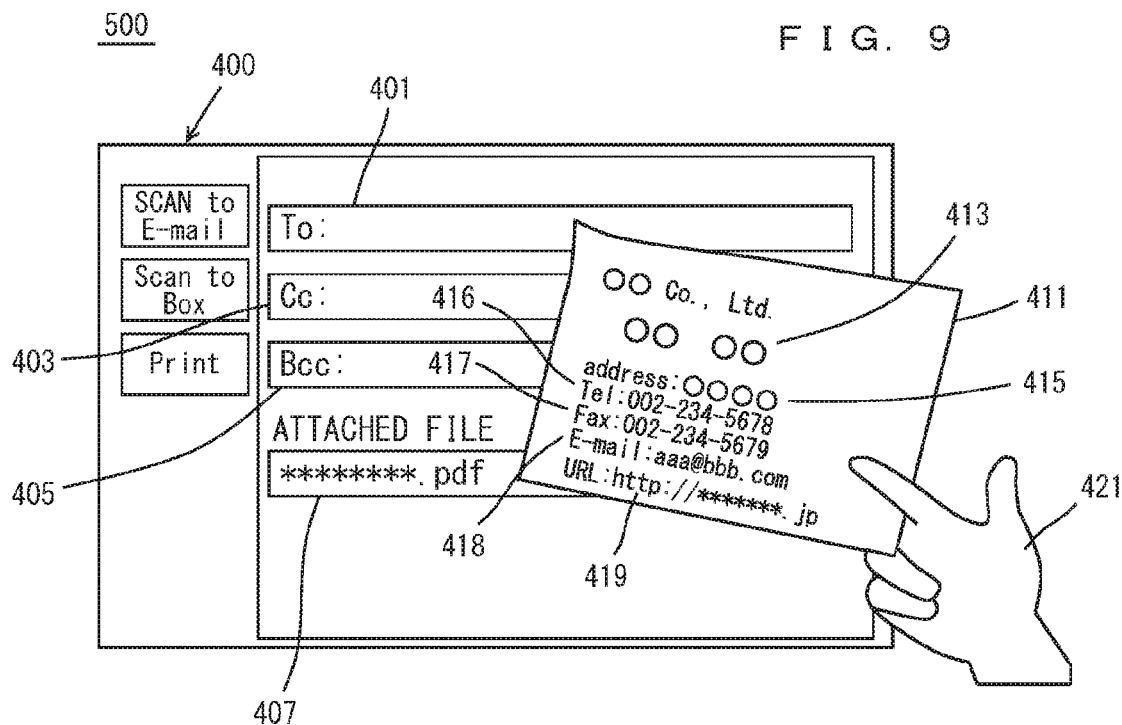
FIG. 9 is a first diagram showing an example of image data output by a camera included in the HMD.

FIG. 9 is a first diagram showing an example of image data output by a camera included in the HMD. It is here assumed, by way of example, that the image data is output from camera 202 of HMD 200 when the user inputs an electronic mail address described in the business card to data input area 401 of operation screen 400. The user's name, the address, the telephone number, the facsimile number, the electronic mail address, and a URL of a home page, are all described in the business card. In this case, an operation by the user is to put part of a vertex on the upper left of the business card in the user's hand, onto a part in which data input area 401 for input of an electronic mail address is displayed.

Referring to FIG. 9, image data 500 includes an image of operation screen 400, an image 411 of business card, and an image 421 of user's hand. Specifically, image 411 of business card includes: an image 413 of the name; an image 415 of the address; an image 416 of the telephone number; an image 417 of the facsimile number; an image 418 of the electronic mail address "aaa@bbb.com", and an image 419 of the URL of the home page. A shape of two edges which forms a vertex on the upper left of the business card is changed to curved line, and the vertex on the upper left of the business card is positioned within data input area 401.

Figure 10:
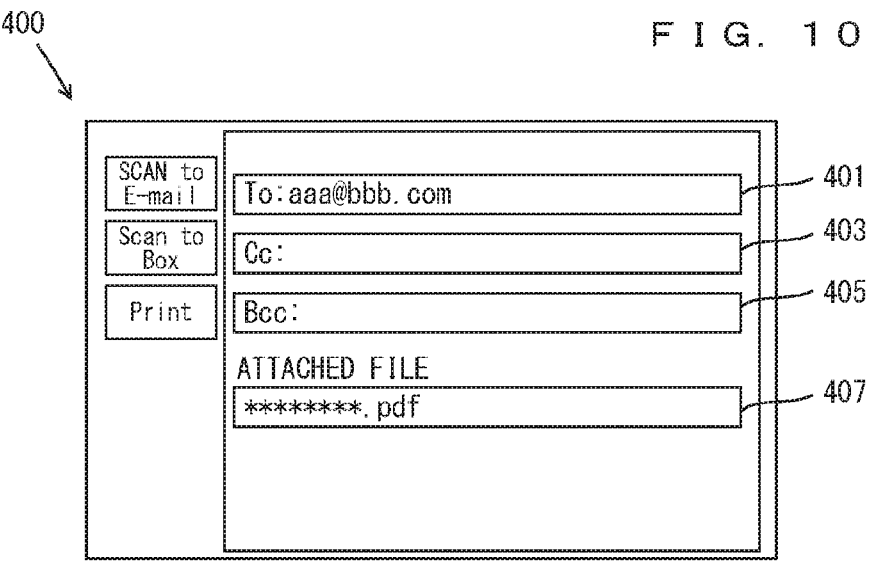
FIG. 10 is a first diagram showing an example of an operation screen after data is input.

FIG. 10 is a first diagram showing an example of an operation screen after data is input. Referring to FIG. 10, a character string "aaa@bbb.com" which is the electronic mail address described in the business card is set in data input area 401.

As shown in FIGS. 9 and 10, MFP 100 analyzes image data 500 that camera 202 included in HMD 200 captures for output, so as to recognize characters in image 418 of the electronic mail address included in image 411 of the business card, and acquire the character string of the electronic mail address "aaa@bbb.com". Further, MFP 100 detects change of a shape of image 411 of the business card, and detects as the instruction position, the position within data input area 401, on which the part of the vertex on the upper left of the business card as part of the changed shape is overlapped with operation screen 400. Then, the character string of the electronic mail address "aaa@bbb.com" is set to data input area 401 including the instruction position.

Figure 11:
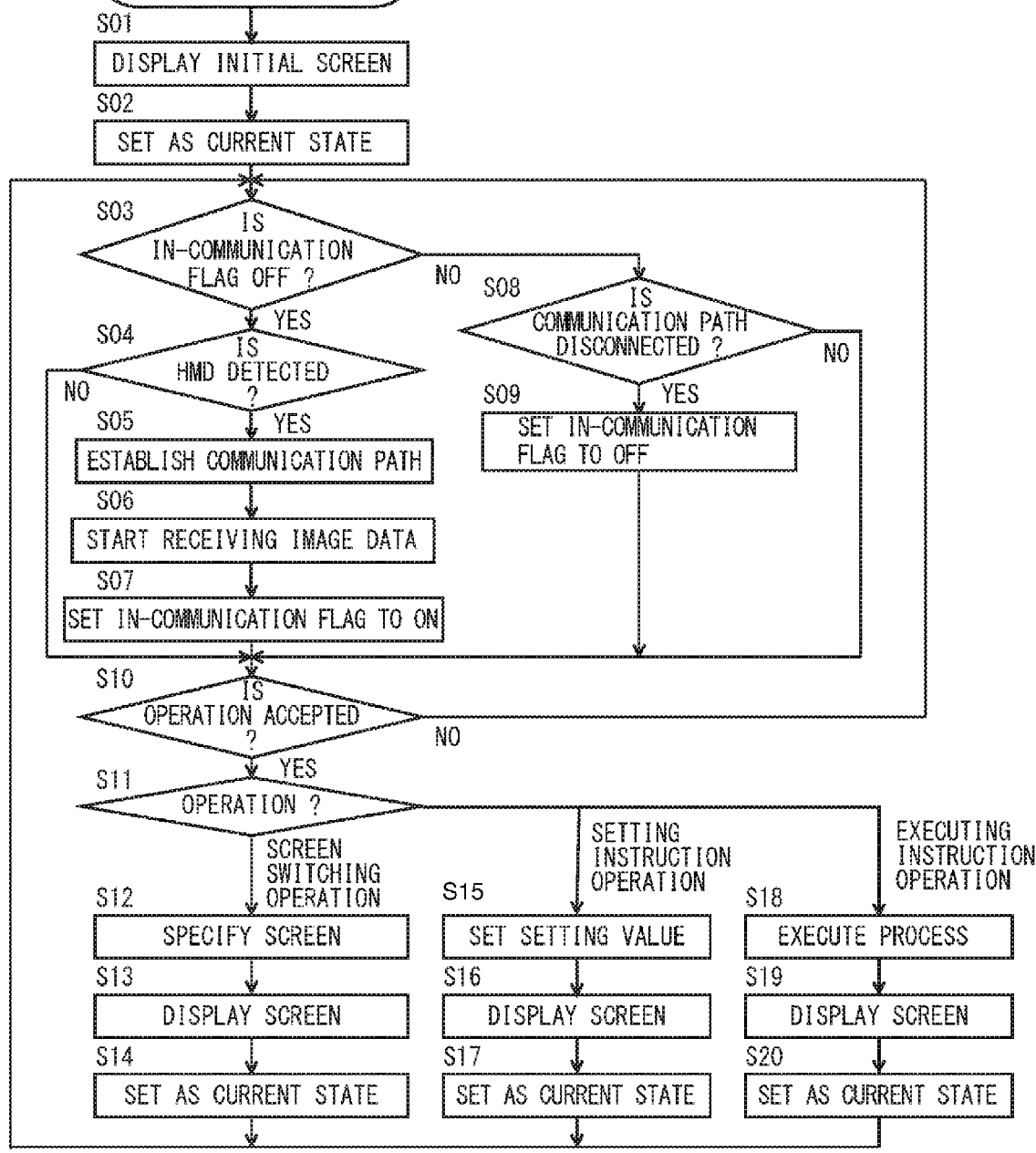
FIG. 11 is a flowchart illustrating an exemplary flow of an operation accepting process according to a first embodiment.

FIG. 11 is a flowchart illustrating an exemplary flow of an operation accepting process according to a first embodiment. The operation accepting process is executed by CPU 111 included in MFP 100 as CPU 111 executes an operation accepting program. Referring to FIG. 11, CPU 111 included in MFP 100 displays an initial screen in display unit 161 (step S01). The initial screen is an operation screen previously determined in MFP 100. In the following step S02, CPU 111 sets the initial screen as the current state, and the process proceeds to step S03.

In step S03, CPU 111 determines whether an in-communication flag is set to OFF. The in-communication flag is set to ON in the case where CPU 111 is communicating with HMD 200, whereas in the case where CPU 111 is not communicating with HMD 200, the in-communication flag is set to OFF. The in-communication flag is set to OFF in an initial state. If the in-communication flag is set to OFF, the process proceeds to step S04; otherwise, the process proceeds to step S08. In step S04, CPU 111 determines whether HMD 200 is detected. If HMD 200 is detected, the process proceeds to step S05; otherwise, the process proceeds to step S10. When short range communication portion 119 becomes able to communicate with HMD 200, HMD 200 is detected. In step S05, CPU 111 controls communication I/F unit 112 so as to establish the communication path with HMD 200, and the process proceeds to step S06.

In step S06, CPU 111 starts receiving the image data from HMD 200. Specifically, CPU 111 controls communication I/F unit 112 so as to receive, via the communication path established in step S05, the image data transmitted by HMD 200. In the following step S07, CPU 111 sets the in-communication flag to ON, and the process proceeds to step S10.

In step S08, CPU 111 determines whether the communication path established in step S05 is disconnected. In the case where communication I/F unit 112 is unable to communicate with HMD 200, or in the case where the communication path is disconnected by HMD 200, CPU 111 determines that the communication path is disconnected. If the communication path is disconnected, the process proceeds to step S09; otherwise, the process proceeds to step S10. In step S09, CPU 111 sets the in-communication flag to OFF, and the process proceeds to step S10.

In step S10, CPU 111 determines whether an operation by the user is accepted. When operation unit 163 detects that the operation by the user is input, CPU 111 accepts the operation by the user. If the operation by the user is accepted, the process proceeds to step S11; otherwise, the process returns to step S03. It is here noted that, in the case where MFP 100 is remotely operated by HMD 200 through the established communication path, if the remote operation is accepted from HMD 200, CPU 111 determines that the operation by the user is accepted.

In step S11, CPU 111 branches the process depending on a kind of the accepted operation. It is here assumed that the operation input by the user includes: a screen switching operation to instruct switching the screen displayed in display unit 161; a setting instruction operation to set a setting value on the basis of the screen displayed in display unit 161; and an executing instruction operation to instruct execution of a process. If the operation accepted in step S10 is the screen switching operation, the process proceeds to step S12; if it is the setting instruction operation, the process proceeds to step S15; and if it is the executing instruction operation, the process proceeds to step S16.

In step S12, CPU 111 specifies a screen determined by the screen switching operation, and the process proceeds to step S13. In step S13, CPU 111 displays in display unit 161 the screen determined by the screen switching operation, and the process proceeds to step S14. In step S14, CPU 111 sets as the current state the screen determined by the screen switching operation, and the process returns to step S03.

In step S15, CPU 111 sets the setting value in the data input area included in the screen displayed in display unit 161, and the process proceeds to step S16. In step S16, CPU 111 redisplays the screen displayed in display unit 161, and the process proceeds to step S17. Thus, a screen after the setting value is set is displayed in display unit 161. In step S17, CPU 111 sets the redisplayed screen as the current state in step S16, and the process returns to S03.

In step S18, CPU 111 executes a process in accordance with the execution instructing operation, and the process proceeds to step S19. In step S19, CPU 111 displays in display unit 161 a screen determined by the process executed in step S18, and the process proceeds to step S20. The screen determined by the process executed in step S18 is, for example, a screen showing that the process is currently being executed, and a screen showing a result of the executed process. In step S20, CPU 111 sets to the current state the screen displayed in display unit 161 in step S19, and the process returns to step S03.

Figure 12:
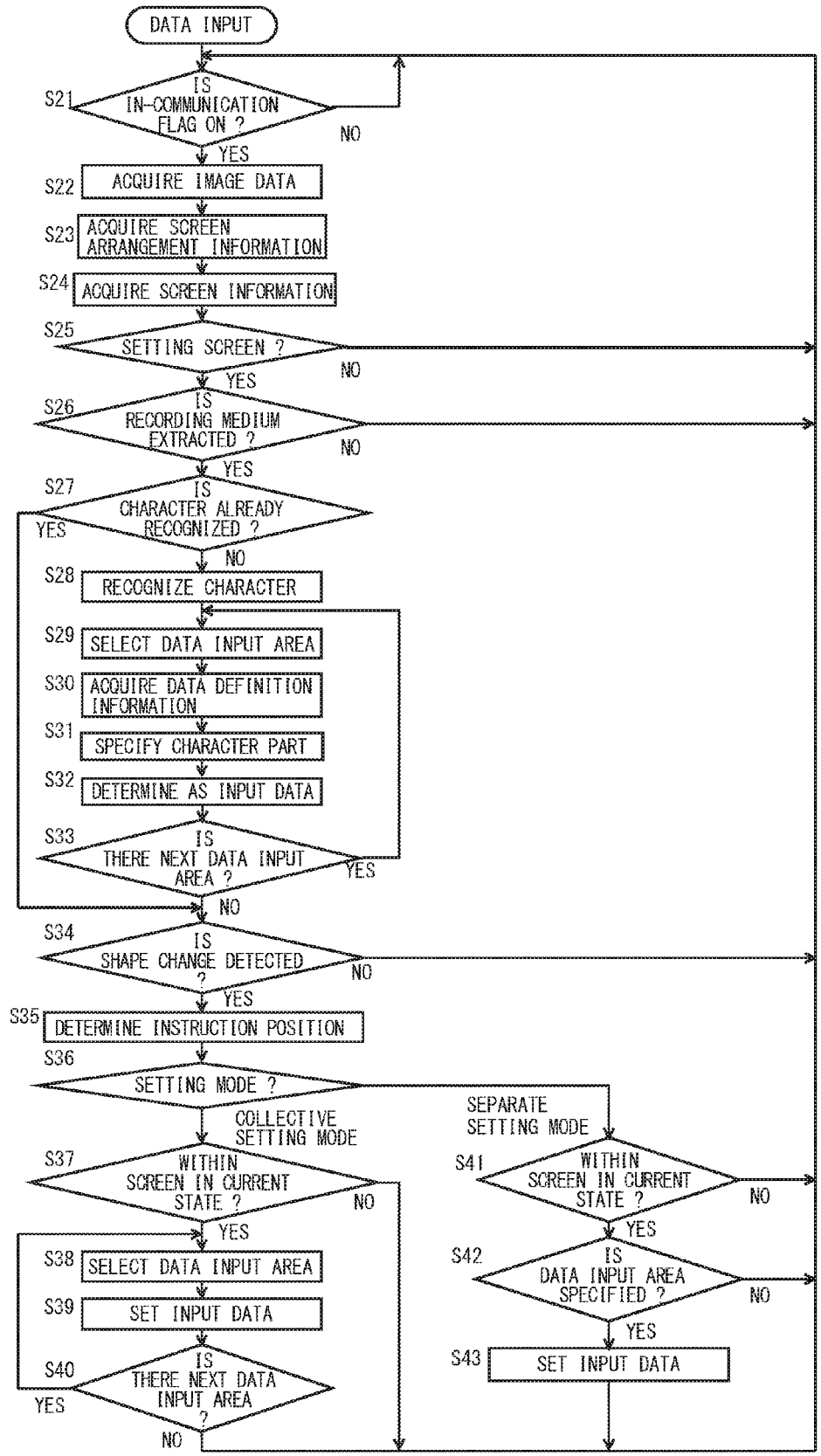
FIG. 12 is a flowchart illustrating an exemplary flow of a data input process.

FIG. 12 is a flowchart illustrating an exemplary flow of a data input process. The data input process is executed by CPU 111 included in MFP 100 as CPU 111 executes the data input program. CPU 111 executes the data input process in parallel with the operation accepting process described above. Referring to FIG. 12, CPU 111 determines whether the in-communication flag is set to ON (step S21). The in-communication flag is a flag set to ON/OFF as CPU 111 executes the operation accepting process described above. The in-communication flag is set to ON in the state where communication I/F unit 112 establishes the communication path with HMD 200, whereas in the state where communication I/F unit 112 does not establish the communication path with HMD 200, the in-communication flag is set to OFF. CPU 111 is in a standby mode until the in-communication flag is set to ON (NO in step S21), and when the in-communication flag is set to ON (YES in step S21), the process proceeds to step S22.

In step S22, CPU 111 acquires the image data that communication I/F unit 112 receives from HMD 200. Then, CPU 111 acquires the screen arrangement information of the screen set as the current state by the operation accepting process described above (step S23). The screen set as the current state is a screen, among one or more screens displayed in display unit 161, which is set as the current state by the operation accepting process. The screen arrangement information includes the screen identification information of the screen set as the current state, and the position information indicating a position on which the screen is arranged in the display surface of display unit 161.

In the following step S24, CPU 111 acquires the screen information of the screen which is set as the current state by the operation accepting process described above. The screen information includes the screen identification information of the screen, and the area information. The area information includes, for each of one or more data input areas for input of data included in the screen, the area identification information for identifying the data input area, the area arrangement information which indicates a position of the data input area in the screen, and the data definition information which defines data that can be input to the data input area.

In step S23 and step S24, CPU 111 acquires the screen arrangement information and the screen information every time one ore more screens displayed in display unit 161 is set as the current state. In other words, every time the screen displayed in display unit 161 is switched, and in the case where one or more screens are displayed in display unit 161, every time any one of the one or more screens is switched to the current state, CPU 111 acquires the screen arrangement information and the screen information.

In step S25, CPU 111 determines whether the screen set as the current state is a setting screen. The setting screen is a screen which includes one or more data input areas. If the screen information includes one or more pieces of the area information, CPU 111 determines that the screen set as the current state is the setting screen. If the screen set as the current state is the setting screen, the process proceeds to step S26; otherwise, the process returns to step S21.

In step S26, CPU 111 determines whether the recording medium is extracted from the image data acquired in step S22. If the recording medium is extracted, the process proceeds to step S27; otherwise, the process returns to step S21. In step S23, CPU 111 distinguishes a still part and a moving object part from two or more pieces of image data acquired at different points of time, and extracts the moving object part as part including the image of the recording medium. The still parts are the same between the two images. Further, aside from or in addition to extracting the moving object part from the image data, CPU 111 may extract from the image data, part of a hand or a finger of the user on the basis of characteristic points such as skin color of the finger and a shape of the fingernail, and extract as part of an image of the business card, an area which is overlapped with the extracted part of the finger. Further, in the case where the recording medium is the business card, which is white colored in most cases, a white colored part of the image data may be extracted as part of the image of the business card.

In step S27, CPU 111 determines whether character recognition on the extracted recording medium has already been performed. If the character recognition has not already been performed, the process proceeds to step S28; otherwise, the process proceeds to step S34. If an image of the recording medium extracted in step S26 is identical or similar to the image of the recording medium extracted at the previous point of time in step S26, CPU 111 determines that the character recognition has already been performed. This is because it is only necessary to execute once the process in step S28 through step S34 on the same recording medium.

In step S28, CPU 111 recognizes characters in the image of the recording medium extracted from the image data in step S26, and the process proceeds to step S29. In step S29, CPU 111 selects the data input area on the basis of the area information included in the screen information acquired in step S24. The area information includes, for each of one or more data input areas for input of data included in the screen, the area identification information for identifying the data input area, the area arrangement information which indicates a position of the data input area in the screen, and the data definition information which defines data that can be input to the data input area.

In the following step S30, CPU 111 acquires the data definition information corresponding to the area identification information of the data input area selected in step S29, based on the area information included in the screen information acquired in step S24. Then, on the basis of the data definition information, CPU 111 specifies as a character part, from the character information acquired by the character recognition performed in step S28, a part corresponding to the data input area selected in S29. For example, in the case where the data input area selected in step S29 corresponds to the data input area for input of the address, CPU 111 specifies part of the address described in the recording medium as the character part, on the basis of the data definition information corresponding to the data input area for input of the address. Further, in the case where the data input area selected in step S29 corresponds to the data input area for input of the name, CPU 111 specifies part of the name described in the recording medium as the character part, on the basis of the data definition information corresponding to the data input area for input of the name. Further, in the case where the data input area selected in step S29 corresponds to the data input area for input of the telephone number, CPU 111 specifies part of the telephone number described in the recording medium as the character part, on the basis of the data definition information corresponding to the data input area for input of the telephone number. Further, in the case where the data input area selected in step S29 corresponds to the data input area for input of the facsimile number, CPU 111 specifies part of the facsimile number described in the recording medium as the character part, on the basis of the data definition information corresponding to the data input area for input of the facsimile number. Further, in the case where the data input area selected in step S29 corresponds to the data input area for input of the electronic mail address, CPU 111 specifies part of the electronic mail address described in the recording medium as the character part, on the basis of the data definition information corresponding to the data input area for input of the electronic mail address. In the following step S32, CPU 111 determines the character part specified in step S31 as the input data corresponding to the data input area selected in step S29, and the process proceeds to step S33.

In step S33, CPU 111 determines whether the data input area to be a process target exists. If there exits the area information including the area identification information of the data input area which is not selected as the process target in step S29, among the area information included in the screen information acquired in step S24, the process returns to step S29; otherwise, the process proceeds to step S34.

In step S34, CPU 111 determines whether change of a shape of the recording medium extracted in step S26 is detected. If the change of a shape of the recording medium is detected, the process proceeds to step S35; otherwise, the process returns to step S21. CPU 111 uses the image data acquired in step S22 so as to detect the change of a shape of the recording medium. Specifically, CPU 111 compares, between two pieces of the image data acquired at different points of time in step S22, parts of the recording medium extracted in step S26. If the shapes of the recording medium in the two pieces of the image data are different from each other, CPU 111 detects the change of a shape of the recording medium. As the recording medium is rectangle-shaped in many cases, in the case where two edges among four edges of the recording medium change from straight line to curved line, CPU 111 detects the change of a shape of the recording medium. In step S35, CPU 111 determines the instruction position, which is part of the changed part of a shape of the recording medium in the image data.

In step S36, CPU 111 branches the process depending on the setting mode. If the setting mode is set to the collective setting mode, the process proceeds to step S37; if the setting mode is set to the separate mode, the process proceeds to step S41.

In step S37, CPU 111 determines whether the instruction position is within a screen in the current state. If the instruction position is within the screen in the current state, the process proceeds to step S38; otherwise, the process returns to step S21. CPU 111 specifies a position of the display surface of display unit 161 among the image data acquired in step S22, and further determines, within the specified display surface, as an area of the screen set as the current state, the area specified by the screen arrangement information acquired in step S23. If the instruction position determined in step S35 is included in the area of the screen as the current state among the image data, CPU 111 determines that the instruction position is within the screen in the current state.

In step S38, CPU 111 selects the data input area on the basis of the area information included in the screen information acquired in step S24. Then, CPU 111 sets on the selected data input area, input data determined in step S32 (step S39), and the process proceeds to step S40. In step S40, CPU 111 determines whether the data input area as a process target exits. If there exists the area information including the area identification information of the data input area which is not selected as the process target in step S38, among the area information included in the screen information acquired in step S24, the process returns to step S38; otherwise, the process proceeds to step S21.

In step S41, CPU 111 determines whether the instruction position is within a screen in the current state. If the instruction position is within the screen in the current state, the process proceeds to step S42; otherwise, the process returns to step S21. In step S42, CPU 111 determines whether the data input area including the instruction position determined in step S35 exists. CPU 111 specifies one or more data input areas, among the image data acquired in step S22 as well as within the screen set as the current state, on the basis of the area information included in the screen information acquired in step S24. If the instruction position determined in step S35 exists within any one of the specified data input areas, CPU 111 specifies the data input area including the instruction position. If the data input area is specified, the process proceeds to step S43; otherwise, the process returns to step S21.

In step S43, CPU 111 sets on the data input area specified in step S42, the input data determined in step S32, and the process returns to step S21.

<Modification of Shape Change Detecting Portion>

Shape change detecting portion 59 shown in FIG. 6 detects change of a shape of the recording medium, but may detect that movement of the recording medium is stopped. For example, in image data 500 shown in FIG. 9, change of a position of image 411 of the business card relative to operation screen 400 is detected, and thereby movement of the business card is detected. CPU 111 determines as the instruction position, the position on which a prescribed part of image 411 of the business card is overlapped with operation screen 400 at the point of time when the relative position between image 411 of the business card and operation screen 400 is not changed. The prescribed part may be, for example, an end point of a direction in which image 411 of the business card moves toward operation screen 400. In image data 500 shown in FIG. 9, in the case where image 411 of the business card moves in a direction from a lower side to an upper side of operation screen 400, a vertex on the upper left of image 411 of the business card becomes the prescribed part.

Modification of First Embodiment

In the embodiment described above, it has been explained, as way of example, that data is input to MFP 100, but in the modification, the data is input to PC 300. In this case, CPU included in PC 300 has the same functions as the functions shown in FIG. 6. PC 300 is able to execute a plurality of application programs in parallel, in such a case, a screen is displayed for each of the plurality of application programs, and a plurality of screens are simultaneously displayed. The plurality of screens may be displayed without being overlapped with each other, and may be displayed with being overlapped with each other. Likewise, in the case where PC 300 executes the plurality of application programs, PC 300 displays the plurality of screens respectively corresponding to each of the plurality of application programs, and sets any one of the plurality of screens as the current state.

Figure 13:
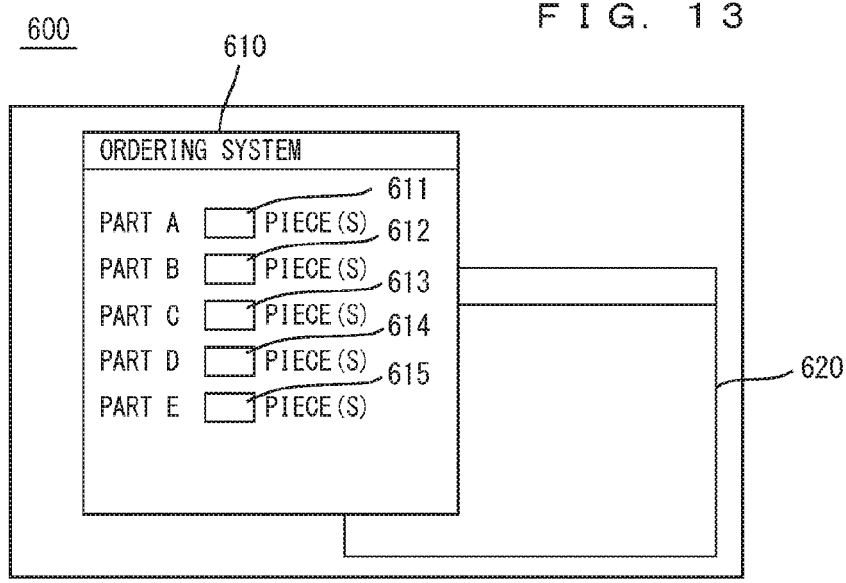
FIG. 13 is a diagram showing an example of on operation screen displayed in the PC.

FIG. 13 is a diagram showing an example of on operation screen displayed in the PC. Referring to FIG. 13, operation screen 600 includes two screens 610 and 620. Screen 610 is superimposed on screen 620 for display, and this indicates that screen 610 is in the current state. Screen 610 is a setting screen for input of order number and amount in an ordering system, and includes data input areas 611 to 615 for input of the order number and amount for each of parts. Data input area 611 is a data input area for input of the order number and amount of "Part A"; data input area 612 is a data input area for input of the order number and amount of "Part B"; data input area 613 is a data input area for input of the order number and amount of "Part C"; data input area 614 is a data input area for input of the order number and amount of "Part D"; and data input area 615 is a data input area for input of the order number and amount of "Part E".

Figure 14:
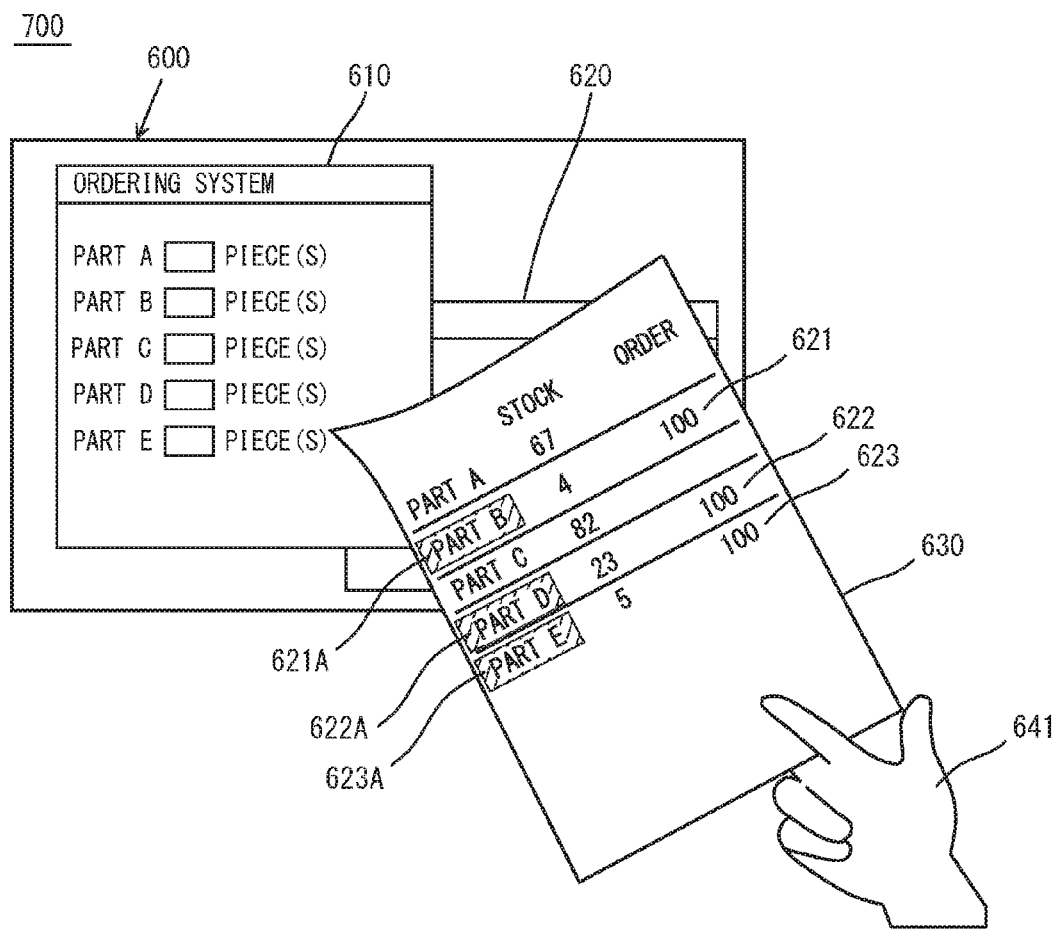
FIG. 14 is a second diagram showing an example of image data output by the camera included in the HMD.

FIG. 14 is a second diagram showing an example of image data output by a camera included in the HMD. Here, the image data output by camera 202 of HMD 200 is shown, by way of example, in the case where an operation of inputting the order number and amount described in an order instruction sheet to screen 610 of operation screen 600 is performed. The order number and amount for each of parts is described in the order instruction sheet. The operation in this case is that the user has the order instruction sheet in hand, and puts part of a vertex of the upper left of the order instruction sheet onto part of a display surface of display unit 306 of PC 300, in which screen 610 is displayed.

Referring to FIG. 14, image data 700 output by camera 202 included in HMD 200 includes an image of operation screen 600, an image 630 of the order instruction sheet, and an image 641 of a hand of the user. Specifically, image 630 of the order instruction sheet includes: an image of stock quantity "67" on the same line as of an image of a character string "Part A"; an image of stock quantity "4" and an image 621 of the order number "100" both on the same line as of an image 621A of a character string "Part B", which is highlighted with a maker by the user to be indicated as a target for input of data, and is hatched in the figure; an image of stock quantity "82" on the same line as of an image of a character string "Part C"; an image of stock quantity "23" and an image 622 of order number "100" both on the same line as of an image 622A of a character string "Part D", which is highlighted with a marker by the user to be indicated as a target for input of data; and an image of stock quantity "5" and an image 623 of order number "100" both on the same line as of an image 623A of a character string "Part E", which is highlighted with a marker by the user to be indicated as a target for input of data.

Figure 15:
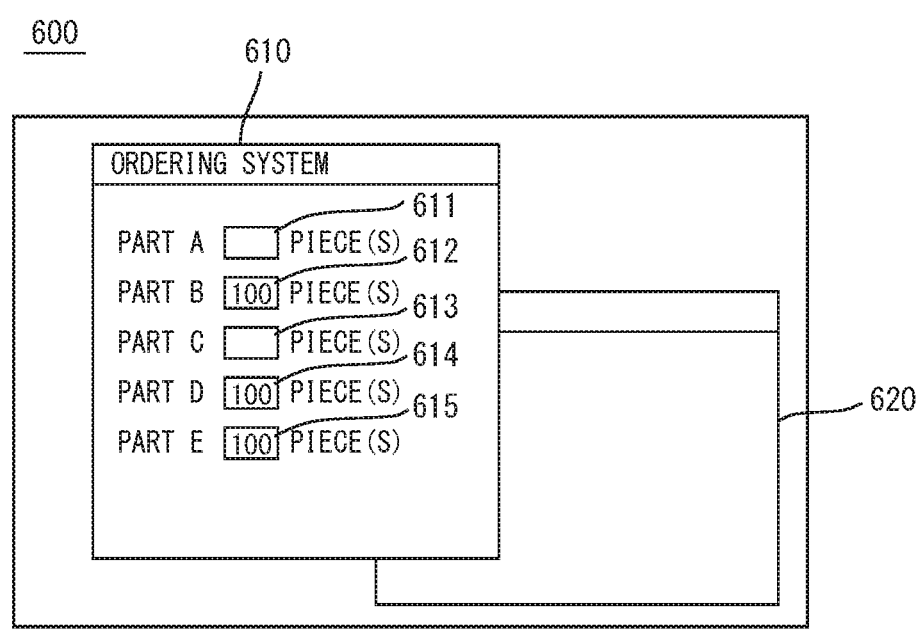
FIG. 15 is a second diagram showing an example of the operation screen after data is input.

FIG. 15 is a second diagram showing an example of an operation screen after the data is input. Referring to FIG. 15, the order number "100" of Part B which is highlighted with a marker in the order instruction sheet is set in data input area 612; the order number "100" of Part D which is highlighted with a marker in the order instruction sheet is set in data input area 614; and the order number "100" of Part E which is highlighted with a marker in the order instruction sheet is set in data input area 615.

As shown in FIG. 14 and FIG. 15, PC 300 analyzes image data 700 captured and output by camera 202 included in HMD 200, so as to perform character recognition on image 621A of Part B, image 622A of Part D and image 623A of Part E, all being highlighted with a marker in the order instruction sheet, as well as on images of the order number 621, 622 and 623 each corresponding respectively to images 621A, 622A and 623A, and then PC 300 acquires the order number of Part B "100", the order number of Part D "100", and the order number of Part E "100". Further, PC 300 detects change of a shape of image 630 of the order instruction sheet, and detects as the instruction position, the changed part of a shape, i.e., a position within screen 610 in which part of a vertex of the upper left of the order instruction sheet is overlapped with operation screen 700. Then, PC 300 sets "100" to data input area 612 corresponding to the order number of Part B, sets "100" to data input area 614 corresponding to the order number of Part D, and sets "100" to data input area 615 corresponding to the order number of Part E, among data input areas 611 to 615 in screen 610 which includes the instruction position.

Figure 16:
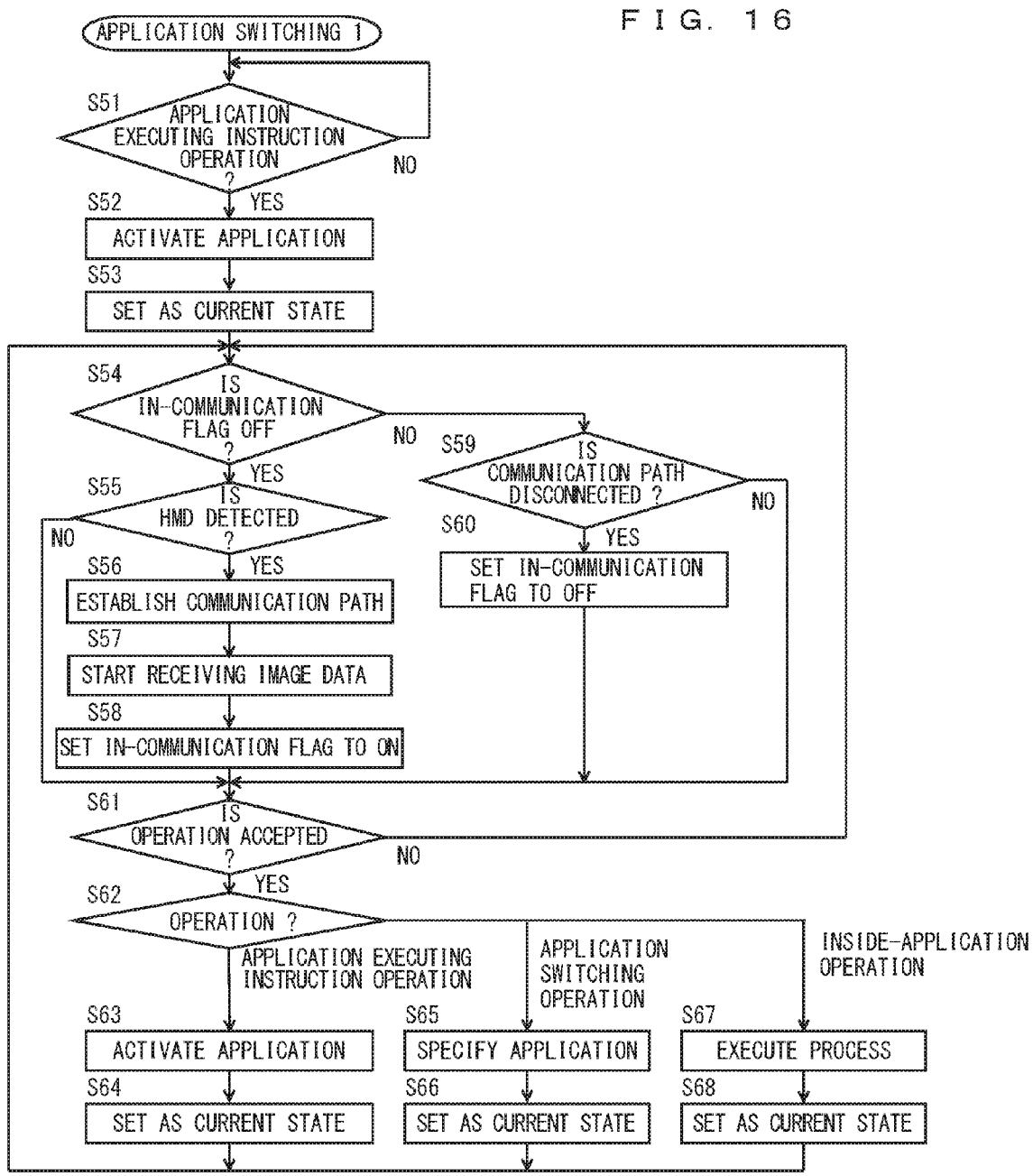
FIG. 16 is a flowchart illustrating an exemplary flow of an application switching process.

FIG. 16 is a flowchart illustrating an exemplary flow of an application switching process. The application switching process is a process executed by CPU 301 included in PC 300 as CPU 301 executes an application switching program. Referring to FIG. 16, CPU 301 included in PC 300 determines whether an application executing instruction is accepted (step S51). CPU 301 is in a standby mode until operation unit 307 accepts the application executing instruction which instructs execution of the application program, and if the application executing instruction is accepted, the process proceeds to step S52. In step S52, CPU 301 executes for activation the application program on which execution is instructed. CPU 301 included in PC 300 displays a screen by execution of the application program. In step S53, CPU 301 sets as the current state the screen displayed by execution of the application program.

The process in step S54 through step S60 is the same as the process in step 03 through step S09 shown in FIG. 7, and therefore, the description thereof will not be repeated here.

In step S61, CPU 301 determines whether operation unit 307 accepts an operation from the user. If the operation by the user is accepted, the process proceeds to step S62; otherwise, the process returns to step S54. In the case where PC 300 is remotely operated by HMD 200, CPU 301 determines whether a remote operation received from HMD 200 is accepted. In step S62, CPU 301 branches the process depending on the accepted operation. It is here assumed that the operation input by the user includes: an application executing instruction operation to instruct activating the application program; an application switching operation to instruct switching the application program in the current state; and an inside-application operation to operate on the application program. If the operation accepted in step S62 is the application executing instruction operation, the process proceeds to step S63; if it is the application switching operation, the process proceeds to step S65; and if it is the inside-application operation, the process proceeds to step S67.

In step S63, CPU 301 activates the application program specified by the application executing instruction operation. Specifically, CPU 301 loads the specified application program into RAM 303 for execution. CPU 301 included in PC 300 executes the application program so as to display a screen. In step S64, CPU 301 sets as the current state, the screen displayed by execution of the application program in step S63, and the process returns to step S54.

In step S65, CPU 301 specifies, on the basis of the application switching operation, the application program after switching. Then, CPU 301 sets as the current state, the screen displayed by execution of the specified application program, and the process returns to step S54.

In step S67, CPU 301 executes the process specified by the inside-application operation, and the process proceeds to step S68. In step S68, CPU 301 sets as the current state, the screen displayed by execution of the process, and the process returns to step S54.

CPU 301 included in PC 300 according to the modification executes the same process as the data input process shown in FIG. 12. Particularly, in step S23 and step S24, every time the screen in the current state switches, CPU 301 acquires the screen arrangement information and the screen information of the screen in the current state.

Second Embodiment

Data input system 1 according to a second embodiment allows HMD 200 to include a part of the function included in MFP 100 in data input system 1 according to the first embodiment. Therefore, as to data input system 1 according to the second embodiment, the differences from the data input system 1 according to the first embodiment will primarily be described below.

Figure 17:
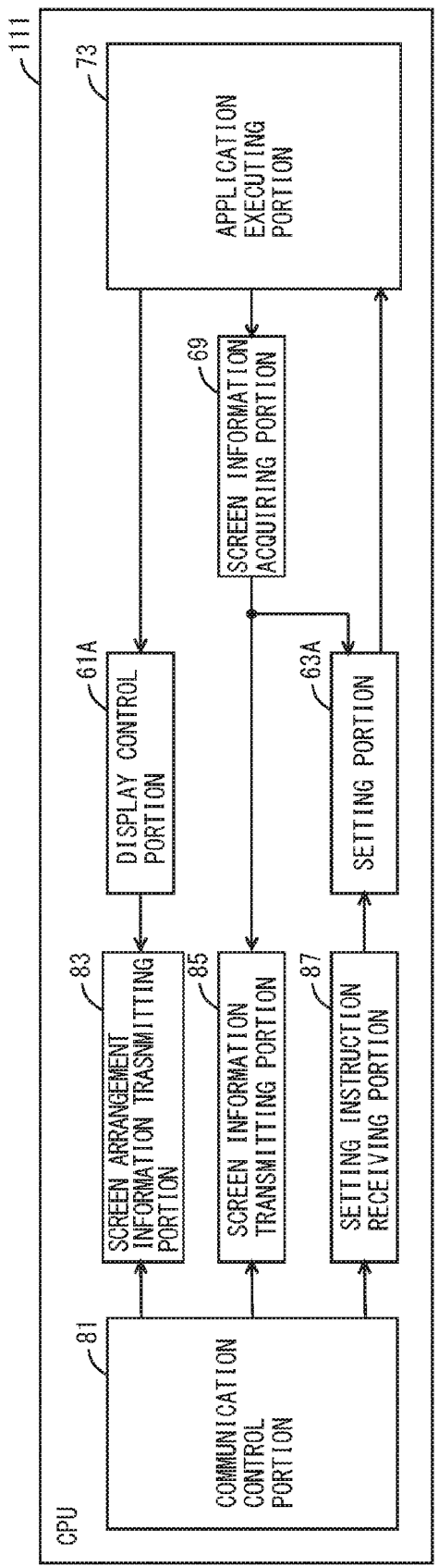
FIG. 17 is a block diagram showing an example of functions of a CPU included in the MFP according to a second embodiment.

FIG. 17 is a block diagram showing an example of functions of a CPU included in the MFP according to a second embodiment. Referring to FIG. 17, the differences from FIG. 6 are: image data receiving portion 51, screen arrangement information acquiring portion 53, instruction position detecting portion 55, recording medium extracting portion 57, shape change detecting portion 59, input information determining portion 65 and information detecting portion 67 are all deleted; a communication control portion 81, a screen arrangement information transmitting portion 83, a screen information transmitting portion 85 and a setting instruction receiving portion 87 are all added; and display control portion 61 and setting portion 63 are changed respectively to a display control portion 61A and a setting portion 63A. Other functions are the same as in FIG. 6, and therefore, a detailed description thereof will not be repeated.

Communication control portion 81 controls short range communication unit 119 and/or communication I/F unit 112 so as to establish the communication path with HMD 200. Further, when short range communication unit 119 becomes able to communicate with HMD 200, communication control portion 81 performs negotiations with HMD 200 so as to set for communicating with HMD 200 via communication I/F unit 112, and controls communication I/F unit 112 so as to establish the communication path with HMD 200. After communication control portion 81 establishes the communication path with HMD 200, communication control portion 81 outputs the path identification information for identifying the communication path, to screen arrangement information transmitting portion 83, screen information transmitting portion 85 and setting instruction receiving portion 87.

Display control portion 61A controls display unit 161, and in response to an event that a screen is input from application executing portion 71, display control portion 61A displays the screen in display unit 161. There may be the case where display control portion 61A displays a plurality of screens in display unit 161. In the case where display control portion 61A displays the plurality of screens in display unit 161, display control portion 61A sets any one of the plurality of screens as a screen in the current state. Display control portion 61A sets, on the basis of an instruction from application executing portion 73, any one of the plurality of screens displayed in display unit 161, as the screen in the current state. Display control portion 61A displays the screen in the current state in a display manner different from another screens. The case where display control portion 61A displays the plurality of screens in display unit 161 is the case where CPU 111 executes a plurality of application programs, the case where CPU 111 executes one application program, and the case where the plurality of screens are input from application executing portion 73. Every time any one of the plurality of screens is set as the current state, display control portion 61A outputs to screen arrangement information transmitting portion 83, the screen arrangement information of the screen in the current state. The screen arrangement information includes the screen identification information for identifying the screen, and the position information indicating a position on which the screen is displayed in the display surface of display unit 161. In the case where the screen is rectangle-shaped, the position information may be represented by the coordinates of vertexes of two opposite angles of the display surface. In the case where CPU 111 executes the plurality of application programs, the screen identification information includes application identification information for identifying the application program.

In response to an event that the screen arrangement information is input from display control portion 61, screen arrangement information transmitting portion 83 controls communication I/F unit 112 so as to transmit the screen arrangement information to HMD 200 via the communication path specified by the path identification information input from communication control portion 81.

In response to an event that the screen information is input from application executing portion 73, screen information acquiring portion 69 outputs the screen information to screen information transmitting portion 85 and setting portion 63A.

In response to an event that the screen information is input from screen information acquiring portion 69, screen information transmitting portion 85 controls communication I/F unit 112 so as to transmit the screen information to HMD 200 via the communication path specified by the path identification information input from communication control portion 81.

Setting instruction receiving portion 87 controls communication I/F unit 112 so as to receive the collective setting instruction or the separate setting instruction from HMD 200 via the communication path specified by the communication identification information input from communication control portion 81. The separate setting instruction includes the screen identification information, the area identification information, and the input data. The collective setting instruction includes one or more pairs of the area identification information, the input data and the screen identification information.

Setting portion 63A receives the screen information from screen information acquiring portion 69, and receives from setting instruction receiving portion 87 the collective setting instruction or the separate setting instruction. In the case where the separate setting instruction is input from setting instruction receiving portion 87, setting portion 63A sets the input data on the basis of the separate setting instruction. Specifically, setting portion 63A sets the input data included in the separate setting instruction, to the data input area specified by the area identification information included in the separate setting instruction of the screen specified by the screen identification information included in the separate setting instruction.

In the case where the collective setting instruction is input from setting instruction receiving portion 87, setting portion 63A sets the input data on the basis of one or more pairs of the area identification information, the input data and the screen identification information, the pairs being included in the collective setting instruction. Specifically, setting portion 63A, for each of the one or more pairs, sets the input data included in the pair to the data input area specified by the area identification information included in the pair of the screen specified by the screen identification information included in the pair.

Figure 18:
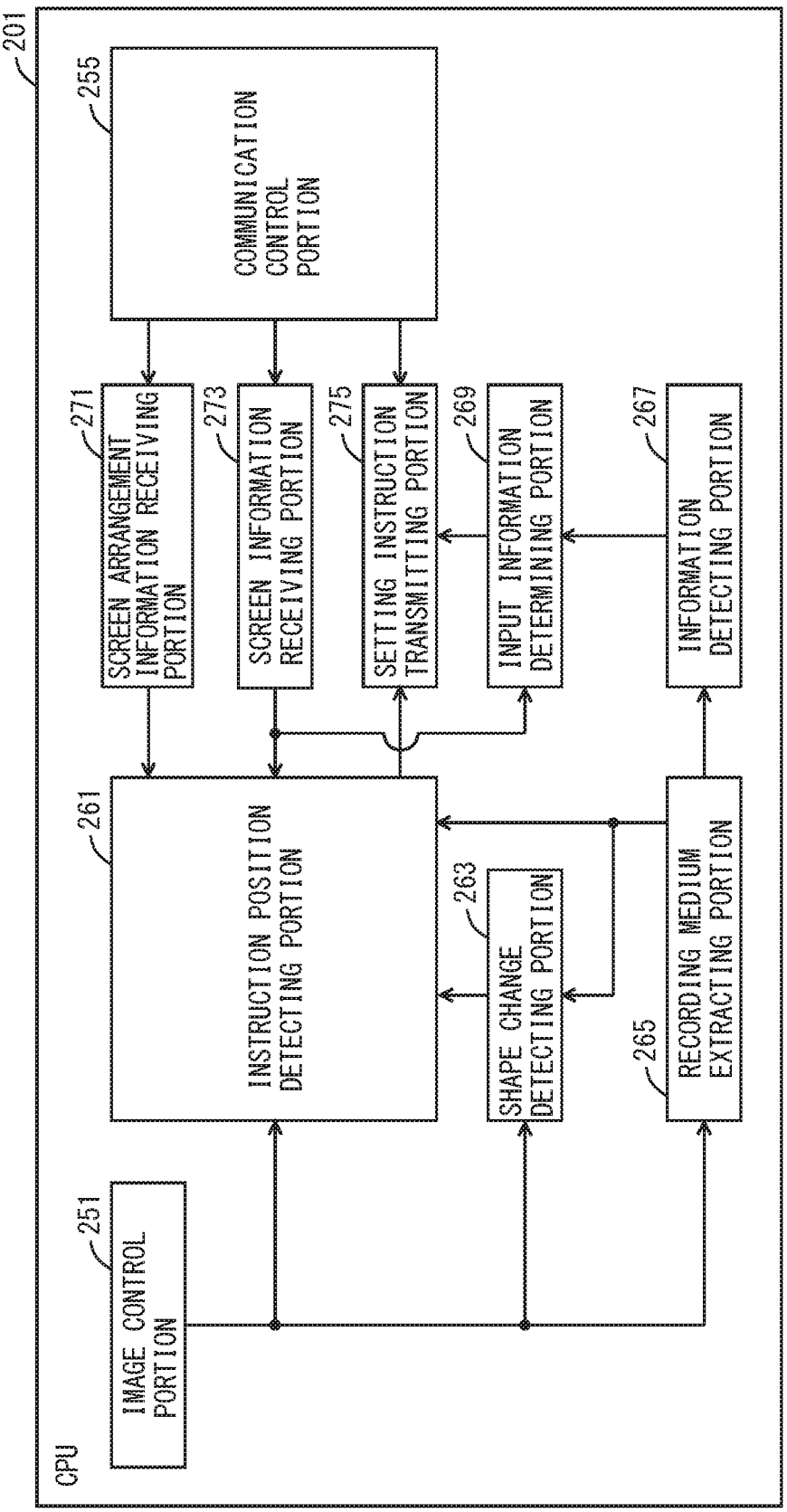
FIG. 18 is a block diagram showing an example of functions of a CPU included in the HMD according to the second embodiment.

FIG. 18 is a block diagram showing an example of functions of a CPU included in the HMD according to the second embodiment. Referring to FIG. 18, the differences from FIG. 7 are: image data transmitting portion 253 is deleted; and a instruction position detecting portion 261, a shape change detecting portion 263, a recording medium extracting portion 265, an information detecting portion 267, an input information determining portion 269, a screen arrangement information receiving portion 271, a screen information receiving portion 273, and a setting instruction transmitting portion 275 are all added. Other functions are the same as in FIG. 7, and therefore, a detailed description thereof will not be repeated.

Screen arrangement information receiving portion 271 controls wireless LAN I/F unit 205 so as to receive the screen arrangement information from MFP 100 via the communication path specified by the path identification information input from communication control portion 255. Screen arrangement information receiving portion 271 outputs the received screen arrangement information to instruction position detecting portion 261.

Screen information receiving portion 273 controls wireless LAN I/F unit 205 so as to receive the screen information from MFP 100 via the communication path specified by the path identification information input from communication control portion 255. Screen information receiving portion 273 outputs the received screen information to instruction position detecting portion 261.

Recording medium extracting portion 265 receives the image data from imaging control portion 251, and extracts an image of a recording medium from the image data. Recording medium extracting portion 265 outputs a pair of the image data and part of the image of the recording medium to information detecting portion 267, shape change detecting portion 263, and instruction position detecting portion 261.

Shape change detecting portion 263 receives the image data from imaging control portion 251, and receives from recording medium extracting portion 265 the pair of the image data and part of the image of the recording medium. Shape change detecting portion 263 detects change of a shape of the recording medium. After the pair of the image data and part of the image of the recording medium is input from recording medium extracting portion 265, shape change detecting portion 263 uses the image data input from imaging control portion 251 so as to detect change of the shape of the recording medium. Specifically, shape change detecting portion 263 extracts, from the image data input from imaging control 251, the same part as part of the image of the recording medium input from recording medium extracting portion 265, and compares the parts of the image of the recording medium between two pieces of the image data. In the case where the shapes of the recording medium between two pieces of the image data are different from each other, shape change detecting portion 263 detects the change of the shape of the recording medium. In response to detection of the change of the shape of the recording medium, shape change detecting portion 263 outputs to instruction position detecting portion 261 position information indicating a position on which part of the shape in the image data input from imaging control portion 251 has changed. Further, in the case where the recording medium is rectangle-shaped, a vertex angle formed by two edges changed from straight line to curved line among four edges of the recording medium may be detected as the changed part of the shape.

Information detecting portion 267 performs character recognition on part of the image of the recording medium input from recording medium extracting portion 265 so as to generate character information. Information detecting portion 267 outputs the generated character information to input information determining portion 269.

Input information determining portion 269 receives the character information from information detecting portion 267, and receives the screen information from screen information receiving portion 273. Input information determining portion 269, on the basis of the area information included in the screen information, for each of the data input areas, detects from the character information part which is identical to the characteristic points defined by the data definition information corresponding to the data input area.

Input information determining portion 269 determines as the input data the part of the character information extracted for each of the data input areas, and outputs to setting instruction transmitting portion 275 a pair of the area identification information of the data input area, the input data, and the screen identification information. In the case where the screen information includes a plurality of pieces of the area information corresponding to each of a plurality of data input areas, input information determining portion 269 outputs to setting instruction transmitting portion 275 for each of the plurality of data input areas, the pair of the area identification information, the input data, and the screen identification information.

Instruction position detecting portion 261 receives the image data from imaging control portion 251, receives the screen arrangement information of a screen in the current state from screen arrangement information receiving portion 281, receives the screen information from screen information receiving portion 273, and receives the pair of the image data and part of the image of the recording medium from recording medium extracting portion 265. In response to an event that the position information indicating a position of the changed part of the recording medium is input from shape change detecting portion 263, instruction position detecting portion 261 detects as a position instructed by the user, from among the image data input from imaging control portion 251, a position specified by the position information input from shape change detecting portion 263.

On detection of the position instructed by the user, in the case where the detected position is within the screen in the current state specified by the screen arrangement information input from screen arrangement information receiving portion 271, instruction position detecting portion 261 outputs a collective transmitting instruction to setting instruction transmitting portion 275. The collective transmitting instruction includes the screen identification information of the screen in the current state. Further, in the case where instruction position detecting portion 261 detects the position instructed by the user, instruction position detecting portion 261 determines whether the detected position is within the data input area of the screen in the current state. Specifically, instruction position detecting portion 261 specifies the data input area of the screen in the current state, on the basis of the area arrangement information of the area information included in the screen information input from screen information receiving portion 273. Then, in the case where the position instructed by the user is within the screen in the current state of the image data as well as within the data input area, instruction position detecting portion 261 outputs a separate transmitting instruction to setting instruction transmitting portion 275. The separate transmitting instruction includes the screen identification information of the screen in the current state, and the area identification information of the specified data input area.

Setting instruction transmitting portion 275 receives the path identification information from communication control portion 255, and receives from instruction position detecting portion 261, the collective setting instruction or a pair of the collective setting instruction and the separate setting instruction. Setting instruction transmitting portion 275 sets a transmission mode to a separate transmission mode or to a collective transmission mode. In the case where screen arrangement information receiving portion 271 receives a plurality of pieces of the screen arrangement information, setting instruction transmitting portion 275 sets to the collective transmission mode, whereas screen arrangement information receiving portion 271 receives a single piece of the screen arrangement information, setting instruction transmitting portion 275 sets to the separate transmission mode. Further, setting instruction transmitting portion 275 sets the transmission mode to either the collective transmission mode or the separate transmission mode in accordance with the operation by the user. The transmission mode may be set in advance by the user.

In the case where the transmission mode is set to the separate transmission mode, and in the case where the separate transmitting instruction is input from instruction position detecting portion 261, setting instruction transmitting portion 275 extracts from among the pairs of the area identification information, the input data and the screen identification information input from input information determining portion 269, a pair including the same screen identification information and area identification information as the screen identification information and area identification information included in the separate transmission instruction, and setting instruction transmitting portion 275 controls wireless LAN I/F portion 205 so as to transmit the separate setting instruction including the extracted pair to MFP 100 via the communication path specified by the path identification information input from communication control portion 255. The separate setting instruction includes the pair of the area identification information, the input data, and the screen identification.

In the case where the transmission mode is set to the collective transmission mode, and in the case where the collective transmitting instruction is input from instruction position detecting portion 261, setting instruction transmitting portion 275 extracts from among the pairs of the area identification information, the input data and the screen identification information input from input information determining portion 269, all of pairs including the same screen identification information as the screen identification information included in the collective transmission instruction, and setting instruction transmitting portion 275 controls wireless LAN I/F portion 205 so as to transmit the collective setting instruction including one or more extracted pairs, to MFP 100 via the communication path specified by the path identification information input from communication control portion 255. The collective setting instruction includes one or more pairs of the area identification information, the input data, and the screen identification.

Figure 19:
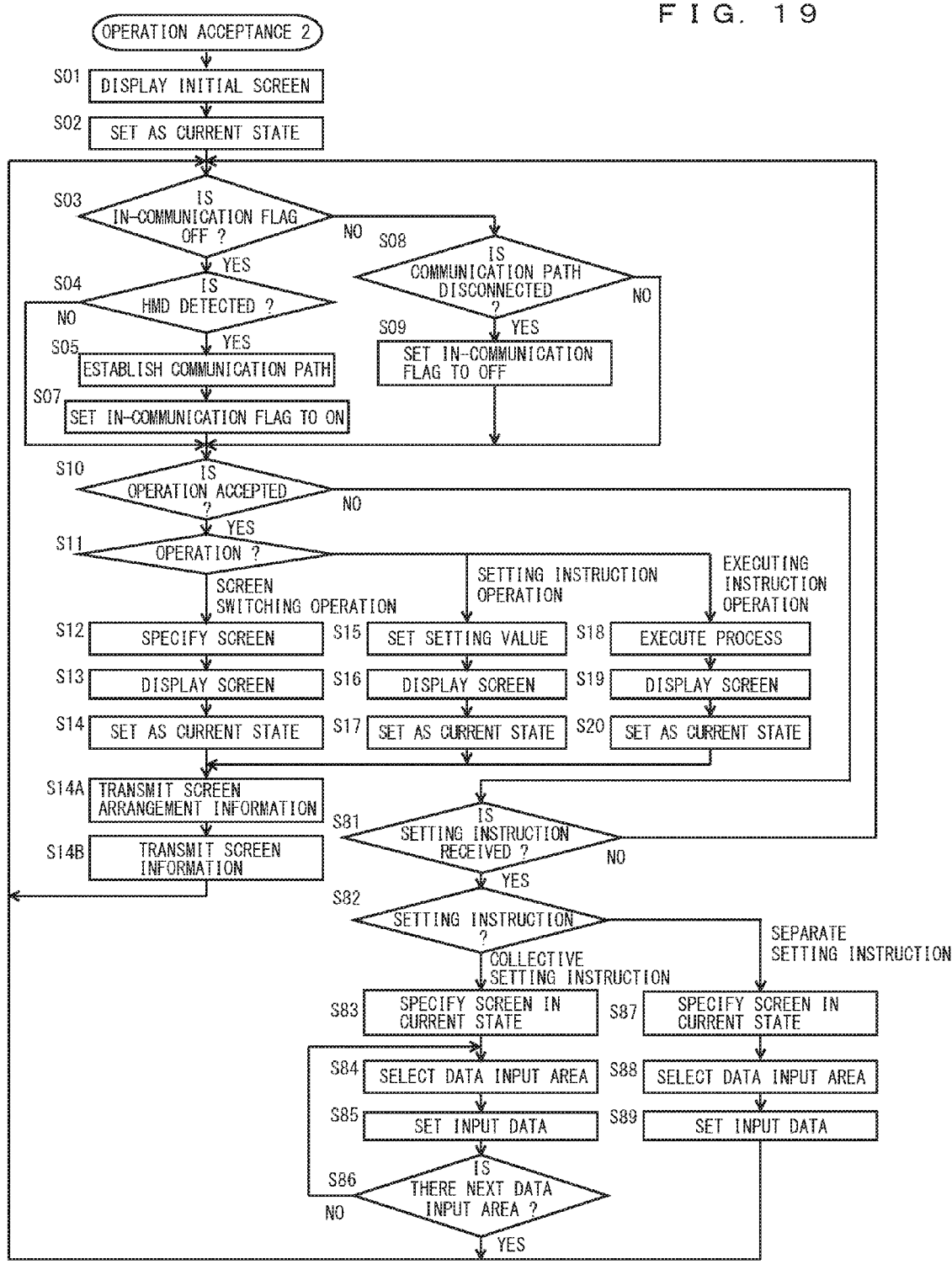
FIG. 19 is a flowchart illustrating an exemplary flow of an operation accepting process according to the second embodiment.

FIG. 19 is a flowchart illustrating an exemplary flow of an operation accepting process according to the second embodiment. The operation accepting process according to the second embodiment is a process executed by CPU 111 included in MFP 100 as CPU 111 executes the operation accepting program. Referring to FIG. 19, the differences from the operation accepting process shown in FIG. 11 are: step S06 is deleted; step S14A and step S14B are added following step S14, step S17 and step S20; and step S81 through step S89 are newly added. Other functions are the same as in FIG. 11, and therefore, a detailed description thereof will not be repeated.

In step S05, CPU 111 controls communication I/F unit 112 so as to establish the communication path with HMD 200, and the process proceeds to step S07. In step S07, CPU 111 sets the in-communication flag to ON, and the process proceeds to step S10.

In step S14, CPU 111 sets as the current state the screen determined by the screen switching operation, and the process proceeds to step S14A. In step S17, CPU 111 sets as the current state the screen redisplayed in step S16, and the process proceeds to step S14A. In step S20, CPU 111 sets as the current state the screen displayed in display unit 161 in step S19, and the process proceeds to step S14A.

In step S14A, CPU 111 transmits to HMD 200 the screen arrangement information of the screen set as the current state in step S14. Specifically, CPU 111 controls communication I/F unit 112 so as to transmit the screen arrangement information to HMD 200 via the communication path established in step S05. In the following step S14B, CPU 111 transmits the screen information of the screen set as the current state to HMD 200, and the process returns to step S03. Specifically, CPU 111 controls communication I/F unit 112 so as to transmit the screen information to HMD 200 via the communication path established in step S05.

In the case where the process proceeds from step S14 to step S14A, CPU 111 transmits to HMD 200 the screen arrangement information and the screen information of the screen determined by the screen switching operation accepted in step S11; in the case where the process proceeds from step S17 to step S14A, CPU 111 transmits to HMD 200 the screen arrangement information and the screen information of the screen redisplayed in step S16; and in the case where the process proceeds from step S20 to step S14A, CPU 111 transmits to HMD 200 the screen arrangement information and the screen information of the screen displayed in display unit 161 in step S19.

In the case where it is determined in step S10 that the operation is not accepted, the process proceeds to step S81. In step S81, it is determined whether communication I/F unit 112 receives the setting instruction via the communication path established in step S05. If the setting instruction is received, the process proceeds to step S82; otherwise, the process returns to step S03. In step S82, CPU 111 branches the process depending on a kind of the setting instruction. If the setting instruction is the collective setting instruction, the process proceeds to step S83, whereas if the setting instruction is the separate setting instruction, the process proceeds to step S87. In step S83, CPU 111 specifies the screen in the current state on the basis of the screen identification information included in the collective setting instruction. Then, in step S84, CPU 111 selects the data input area corresponding to the area information included in the collective setting instruction. As the collective setting instruction includes one or more pairs of the area identification information, the input data and the screen identification information, one pair is selected as the process target from the one or more pairs, and the data input area specified by the area identification information included in the selected pair is selected. In the following step S85, CPU 111 sets the input data included in the pair selected in step S84 to the selected data input area, and the process proceeds to step S86. In step S86, CPU 111 determines whether a not-selected data input area exits. If a not-selected pair exits among a plurality of pairs included in the collective setting instruction, CPU 111 determines that the not-selected data input area exists. If the not-selected data input area exits, the process returns to step S84; otherwise, the process returns to step S03.

In step S87, CPU 111 specifies the screen in the current state on the basis of the screen identification information included in the separate setting instruction. The separate setting instruction includes a pair of the area identification information, the input data and the screen identification information. Then, CPU 111 selects the data input area specified by the area identification information included in the separate setting instruction (step S88). In the following step S89, CPU 111 sets the input data included in the separate setting instruction to the selected data input area, and the process returns to step S03.

Figure 20:
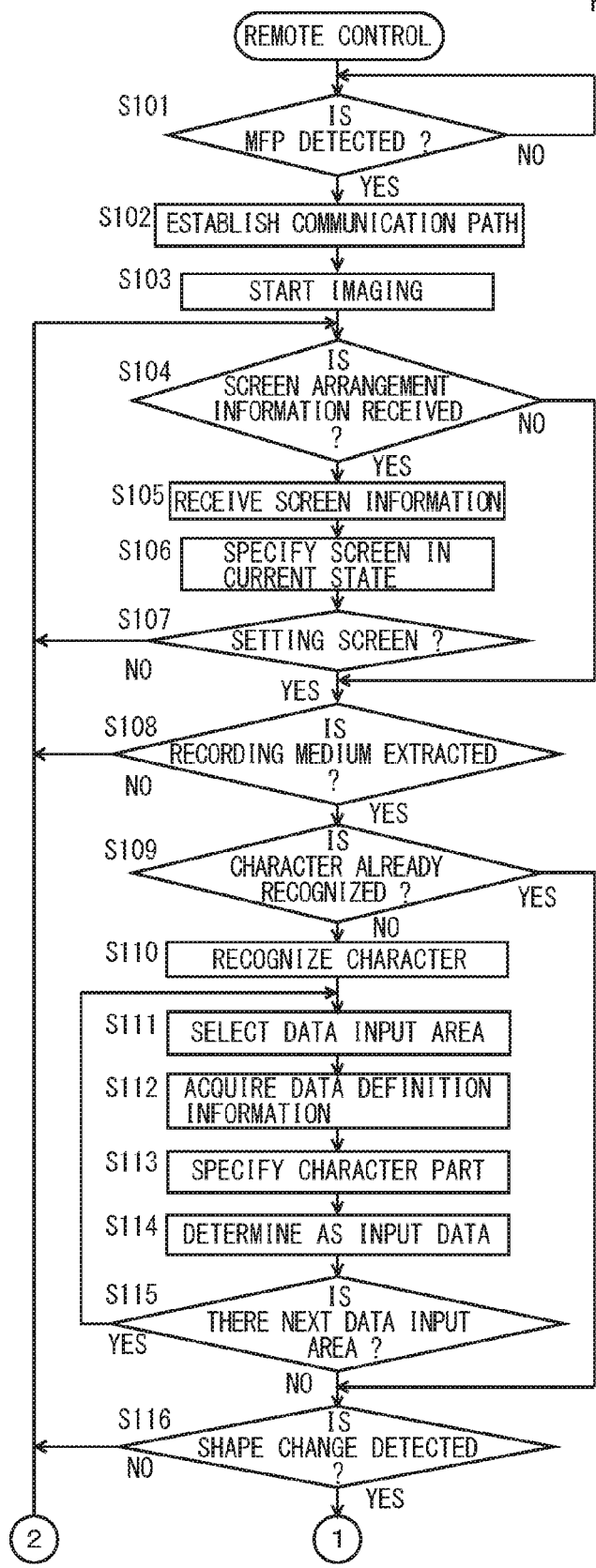
FIG. 20 is a first flowchart illustrating an exemplary flow of a remote control process.
Figure 21:
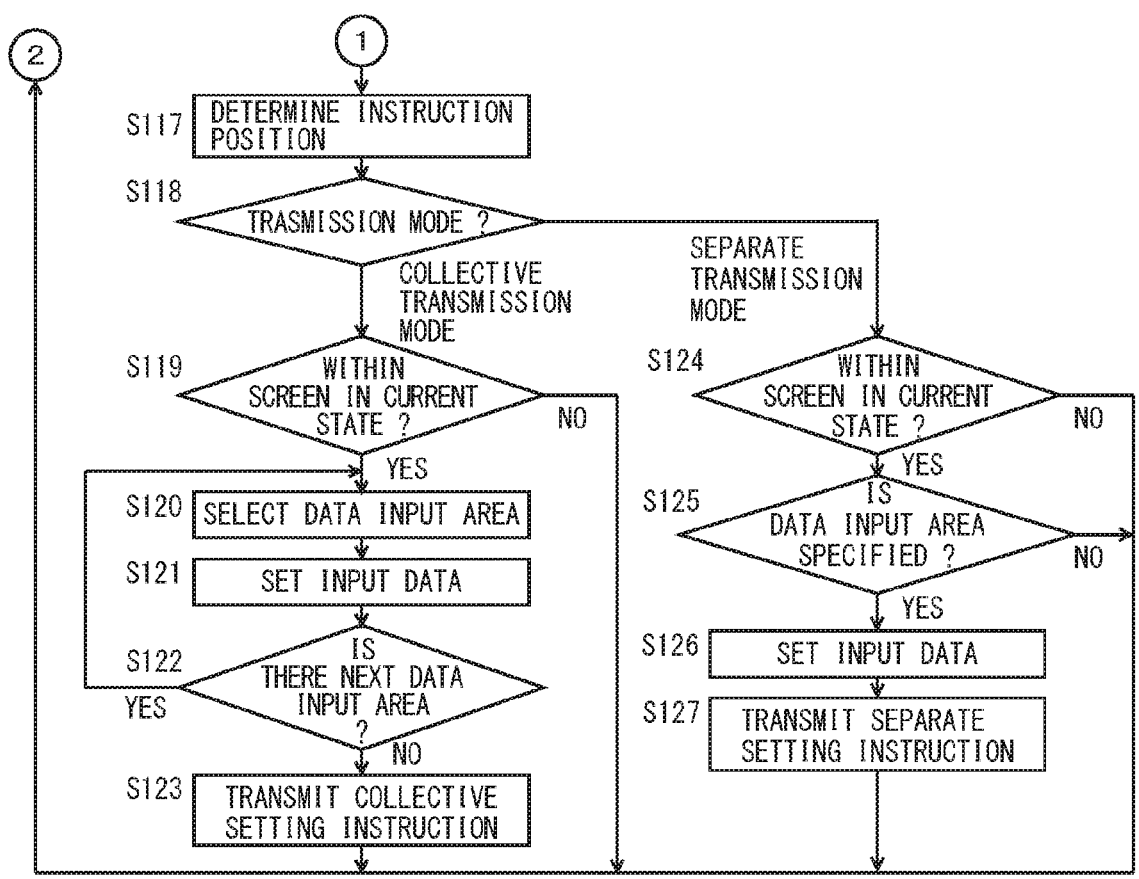
FIG. 21 is a second flowchart illustrating an exemplary flow of the remote control process.

FIG. 20 and FIG. 21 are flowcharts each illustrating an exemplary flow of a remote control process. The remote control process is executed by CPU 201 included in HMD 200 as CPU 201 executes the data input program. Referring to FIG. 20, CPU 201 determines whether MFP 100 is detected (step S101). When short range communication unit 207 becomes able to communicate with MFP 100, CPU 201 detects MFP 100. In the following step S102, CPU 201 controls wireless LAN I/F 205 so as to establish the communication path with MFP 100.

In the following step S103, CPU 201 controls camera 202 so as to start imaging. In the following step S104, CPU 201 determines whether the screen arrangement information is received from MFP 100. CPU 201 controls wireless LAN I/F 205 receives the screen arrangement information from MFP 100 via the communication path established in step S102. The screen arrangement information corresponds to the screen which is set as the current state in MFP 100. If the screen arrangement information is received from MFP 100, the process proceeds to step S105; otherwise, the process proceeds to step S108.

In step S105, CPU 201 receives the screen information from MFP 100, and the process proceeds to step S106. CPU 201 controls wireless LAN I/F 205 so as to receive the screen information from MFP 100 via the communication path established in step S102.

In step S106, CPU 201 specifies the screen in the current state on the basis of the screen information received in step S105. In the following step S107, CPU 201 determines whether the screen in the current state is a setting screen. The screen information includes the screen identification information and the area information. The area information includes, for each of one or more data input areas included in the screen for input of data, area identification information for identifying the data input area, the area arrangement information which indicates a position of the data input area in the screen, and the data definition information which defines data that can be input to the data input area. If the screen information includes one or more pieces of the area information, CPU 201 determines that the screen set as the current state is the setting screen. If the screen is the setting screen, the process proceeds to step S108; otherwise, the process returns to step S104.

In step S108, CPU 201 determines whether the recording medium is extracted from the image data output by camera 202. If the recording medium is extracted, the process proceeds to step S109; otherwise, the process returns to step S104. Specifically, CPU 201 distinguishes a still part and a not-still part from two or more pieces of image data output by camera 202 at different points of time, and extracts a moving object part which is not the still part, as part including the image of recording medium. The still parts are the same between the two images. Aside from or in addition to extracting the moving object part from the image data, part of a hand or a finger of the user may be extracted from the image data on the basis of characteristic points such as skin color of the finger and a shape of the fingernail, and an area which is overlapped with the extracted part of the finger may be extracted as part of the image of the recording medium. Further, part of the image of the recording medium may be extracted on the basis of characteristic points such as shape and color of the recording medium.

In step S109, CPU 201 determines whether character recognition on the extracted recording medium has already been performed. If the character recognition has not been performed yet, the process proceeds to step S110; otherwise, the process proceeds to step S116. The process in step S110 through step S115 is the same as the process in step S28 through step S33 shown in FIG. 12, and therefore, the description thereof will not be repeated here.

In step S116, CPU 201 determines whether change of a shape of the recording medium extracted in step S108 is detected. If the change of a shape of the recording medium is detected, the process proceeds to step S117; otherwise, the process returns to step S104. CPU 201 uses the image data output by camera 202 so as to detect the change of a shape of the recording medium. The process of step S116 is the same as the process executed in step S34 in FIG. 12.

In step S117, CPU 201 determines the instruction position. CPU 201 determines as the instruction position the changed part of a shape of the recording medium in the image data. In the following step S118, CPU 201 branches the process depending on the transmission mode. If the transmission mode is set to the collective transmission mode, the process proceeds to step S119; if the transmission mode is set to the separate transmission mode, the process proceeds to step S124.

In step S119, CPU 201 determines whether the instruction position is within the screen in the current state. If the instruction position is within the screen in the current state, the process proceeds to step S120; otherwise, the process returns to step S104. CPU 201 specifies from image data output by camera 202, a position of the display surface of display unit 161 included in MFP 100, and in the specified display surface, CPU 201 further determines as the area of the screen set as the current state, the area specified by the screen arrangement information received in step S104. If the instruction position determined in step S117 is included in the area of the screen set as the current state in the image data, CPU 201 determines that the instruction position is within the screen in the current state.

In step S120, CPU 201 selects the data input area on the basis of the area information included in the screen information received in step S105. Then, CPU 201 sets the input data determined in step S114 to the selected data input area (step S121), and the process proceeds to step S122. In step S122 CPU 201 determines whether the data input area to be the process target exits. If the area information including the area identification information of the data input area which is not selected as the process target in step S120 exists in the area information included in the screen information received in step S105, the process returns to step S120; otherwise, the process proceeds to step S123. In step S123, CPU 201 transmits the collective setting instruction to MFP 100, and the process returns to step S104. Specifically, CPU 201 controls wireless LAN I/F 205 so as to transmit the collective setting instruction to MFP 100 via the communication path established in step S102. The collective setting instruction in step S111 through step S115 includes a pair of the input data determined for each of one or more data input areas, the area identification information of the data input area, and the screen identification information of the screen in the current state.

In step S124, CPU 201 determines whether the instruction position is within the screen in the current state. If the instruction position is within the screen in the current state, the process proceeds to step S125; otherwise, the process returns to step S104. In step S125, CPU 201 determines whether the data input area including the instruction position determined in step S117 exits. CPU 201 specifies one or more data input areas in the image data output by camera 202, as well as in the area of the screen set as the current state, on the basis of the area information included in the screen information acquired in step S105. Then, if the instruction position determined in step S117 exits in any one of the specified data input areas, the data input area including the instruction position is specified. If the data input area is specified, the process proceeds to step S126; otherwise, the process returns to step S104.

In step S126, CPU 201 sets the input data determined in step S114 to the data input area specified in step S125, and the process proceeds to step S127. In step S127, CPU 201 transmits the separate setting instruction to MFP 100, and the process returns to step S104. Specifically, CPU 201 controls wireless LAN I/F 205 so as to transmit the separate setting instruction to MFP 100 via the communication path established in step S102. The separate setting instruction includes a pair of the area identification information of the data input area specified in step S125, the input data set to the data input area in step S126, and the screen identification information of the screen in the current state.

Modification of Second Embodiment

In the embodiment described above, it has been explained, as way of example, that data is input to MFP 100, but in the modification, the data is input to PC 300. In this case, CPU included in PC 300 has the same functions as the functions of CPU 111 included in MFP 100 shown in FIG. 17. PC 300 is able to execute a plurality of application programs in parallel, in such a case, a screen is displayed for each of the plurality of application programs, and a plurality of screens are simultaneously displayed. The plurality of screens may be displayed without being overlapped with each other, and may be displayed with being overlapped with each other. Likewise, in the case where PC 300 executes the plurality of application programs, PC 300 displays the plurality of screens respectively corresponding to each of the plurality of application programs, and sets any one of the plurality of screens as the current state. Further, the application program which displays the screen set as the current state is set as the current state.

Figure 22:
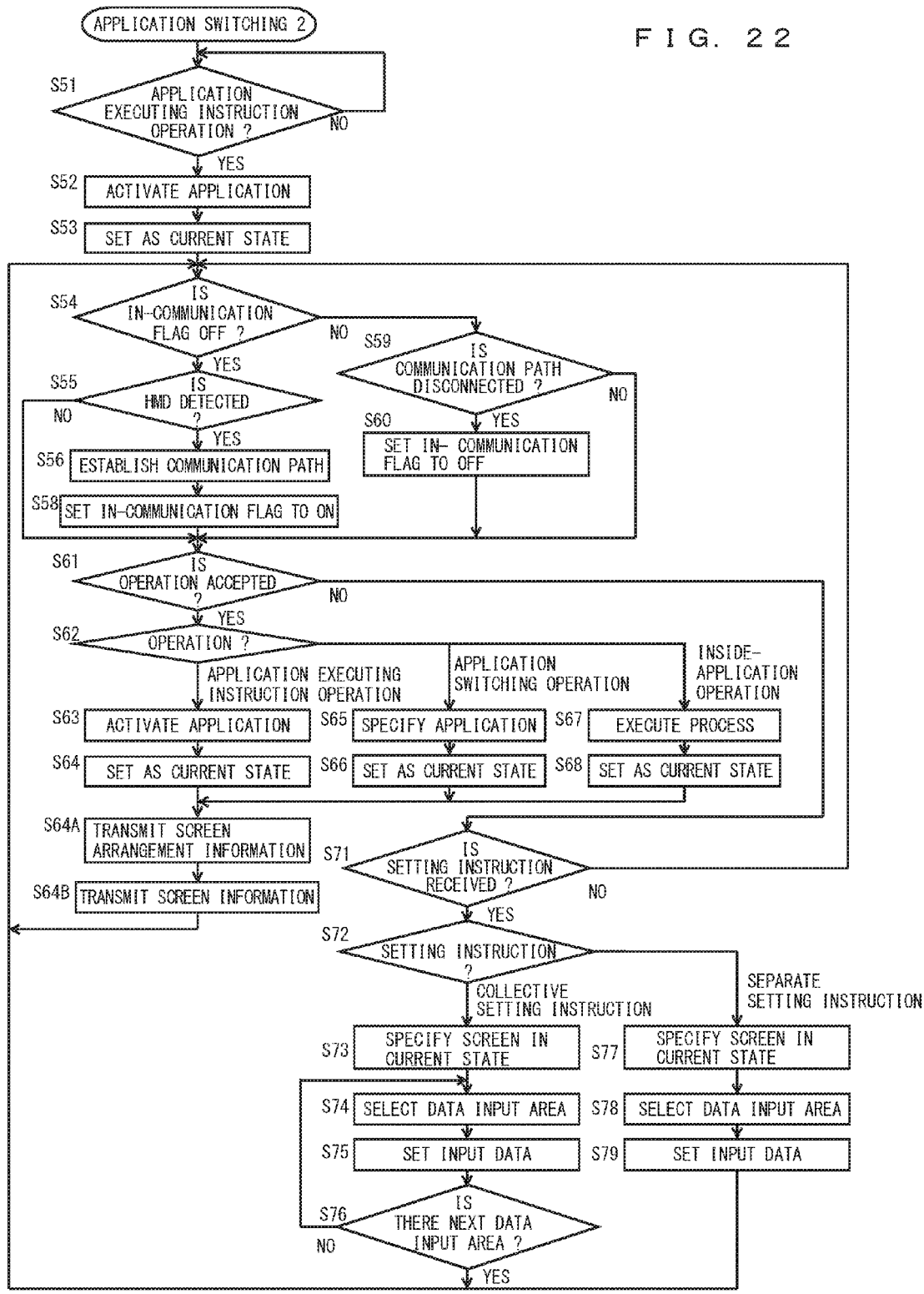
FIG. 22 is a flowchart illustrating an exemplary flow of an application switching process executed by a CPU included in the PC according to a modification of the second embodiment.

FIG. 22 is a flowchart illustrating an exemplary flow of an application switching process executed by a CPU included in the PC according to a modification of the second embodiment. The application switching process according to the modification of the second embodiment is a process executed by a CPU included in PC 300 as the CPU executes the application switching program according to the modification of the second embodiment. Referring to FIG. 22, the differences from the application switching process shown in FIG. 16 are: step S57 is deleted; step S64A and step S64B are added following step S64, step S66 and step S68; and step S71 through step S79 are newly added. Other functions are the same as in FIG. 16, and therefore, a detailed description thereof will not be repeated.

In step S56, the CPU establishes the communication path with HMD 200, and the process proceeds to step S58. In step S58, the CPU sets the in-communication flag to ON, and the process proceeds to step S61.

In step S63, the CPU activates the application program specified by the application executing instruction operation. The CPU included in PC 300 displays the screen by executing the application program. In step S64, the CPU sets as the current state the screen displayed by execution of the application program in step S63, and the process proceeds to step S64A. In step S64A, the CPU transmits the screen arrangement information of the screen set as the current state to HMD 200, and the process proceeds to step S64B. Specifically, the CPU transmits the screen arrangement information to HMD 200 via the communication path established in step S56. In the following step S64B, the CPU transmits the screen information of the screen set as the current state to HMD 200, and the process returns to step S54. Specifically, the CPU transmits the screen information to HMD 200 via the communication path established in step S56.

In the case where the CPU determines that the operation is not accepted in step S61, the process proceeds to step S71. In step S71, the CPU determines whether the setting instruction is received via the communication path established in step S56. If the setting instruction is received, the process proceeds to step S72; otherwise, the process returns to step S54.

In step S72, the CPU branches the process depending on a kind of the setting instruction. If the setting instruction is the collective setting instruction, the process proceeds to step S73, whereas if the setting instruction is the separate setting instruction, the process proceeds to step S77. In step S73, the CPU specifies the screen in the current state on the basis of the screen identification information included in the collective setting instruction. Then, in step S74, the CPU selects the data input area corresponding to the area information included in the collective setting instruction. As the collective setting instruction includes one or more pairs of the area identification information, the input data and the screen identification information, the CPU selects any one pair from the one or more pairs, as the process target, and selects the data input area specified by the area identification information included in the selected pair. In the following step S75, the CPU sets the input data included in the collective setting instruction to the selected data input area, and the process proceeds to step S76. In step S76, the CPU determines whether a not-selected data input area exits. If a not-selected pair exits among a plurality of pairs included in the collective setting instruction, the CPU determines that the not-selected data input area exists. If the not-selected data input area exits, the process returns to step S74; otherwise, the process returns to step S54.

In step S77, the CPU specifies the screen in the current state on the basis of the screen identification information included in the separate setting instruction. The separate setting instruction includes a pair of the area identification information, the input data and the screen identification information. Then, the CPU selects the data input area specified by the area identification information included in the separate setting instruction (step S78). In the following step S79, the CPU sets the input data included in the separate setting instruction to the selected data input area, and the process returns to step S54.

As described above, MFP 100 in the foregoing embodiment functions as a data input apparatus capable of receiving image data acquired from an image of a subject captured by camera 202 included in HMD 200; detecting information stored in a recording medium included in the received image data; extracting from the detected information, input information which can be input to a data input area of a screen displayed in display unit 161; on the basis of a relative position between a display surface of display unit 161 and the recording medium both included in the image data received from HMD 200, detecting an instruction position within the display surface; and in the case where the detected instruction position is a prescribed position, setting the extracted input information as data input to the data input area. Therefore, the input information extracted from the information stored in the recording medium as data which can be input to the data input area is set to the data input area of the screen displayed in display unit 161, and this allows setting data to the data input area included in an arbitrary screen. Further, the user can perform an operation of changing the relative position between the recording medium and the display surface, and thereby can easily set the data to the data input area.

Further, in response to an event that an instruction position is detected within the data input area included in the screen displayed in display unit 161, the input information is set to the data input area including the instruction position. Therefore, the user can perform an operation of designating as the prescribed position the relative position between the data input area and the recording medium included in the screen.

Further, in response to an event that the instruction position is detected within the screen displayed in display unit 161, the input information is set to the data input area included in the screen including the instruction position. Therefore, the user can perform an operation of designating as the prescribed position the relative position between the screen and the recording medium. In the case where the displayed screen includes a plurality of data input areas, the input information is set to each of the plurality of data input areas, and this allows setting the data respectively to each of the plurality of data input areas at one time.

Further, the input information is extracted on the basis of data definition information defining data which can be input to the data input area included in the screen, and this allows readily extracting from the information stored in the recording medium, the data which can be input to the data input area.

Further, a position in the screen displayed in display unit 161 is determined on the basis of screen arrangement information indicating a position on which the screen displayed in display unit 161 is arranged in the display surface. Therefore, even in the case where a plurality of screens are displayed in display unit 161, it is possible to input data to the data input area included in one screen among the plurality of screens.

Further, a position of the data input area included in the screen displayed in display unit 161 is determined on the basis of area arrangement information indicating a position on which the data input area included in the screen displayed in display unit 161 is arranged in the screen, and this allows specifying one data input area in the case where the screen includes a plurality of data input areas.

Further, change of a shape of the recording medium is detected on the basis of the image data received from HMD 200, as well as the instruction position is determined on the basis of the relative position between the recording medium and the display surface at the point of time when the change of a shape is detected, and this allows determining a timing of detecting the relative position between the recording medium and the display surface of display unit 161.

Further, a position on which part of the changed shape of the recording medium is overlapped with the display surface is detected as the instruction position, and this allows specifying a position within the screen displayed in display unit 161.

Further, in the case where the recording medium is a business card, a vertex angle formed by two edges changed from straight line, among four edges of the recording medium, is determined as part of the changed shape, and this allows detecting an operation by the user of putting the recording medium onto the display surface.

Further, change of the relative position between the recording medium and the display surface is detected on the basis of the image data received from HMD 200, as well as the instruction position is determined on the basis of the relative position between the recording medium and the display surface at the point of time when the change of the relative position becomes equal to or less than a prescribed value, this allows specifying a timing of detecting the relative position between the recording medium and the display surface, and specifying a position in the screen at the timing.

Further, the part of the display surface which is overlapped, at the point of time when change of the relative position becomes equal to or less than a prescribed value, with an apical end of a direction in which the recording medium moves toward the display surface during the time when the relative position between the recording medium and the display surface is changing, is detected as the instruction position. This allows specifying the position within the screen displayed in display unit 161.

In the second embodiment, in order to cause HMD 200 to include instruction position detecting portion 55, information detecting portion 67 and input information determining portion 65 among a plurality of functions included in MFP 100 shown in FIG. 6 in the first embodiment, HMD 200 in the second embodiment includes: instruction position detecting portion 261 shown in FIG. 18 as a function corresponding to instruction position detecting portion 55; information detecting portion 267 shown in FIG. 18 as a function corresponding to information detecting portion 67; and input information determining portion 269 shown in FIG. 18 as a function corresponding to input information detecting portion 65. Likewise, in the second embodiment, instruction position detecting portion 55, information detecting portion 67 and input information determining portion 65 among a plurality of functions included in MFP 100 shown in FIG. 6 in the first embodiment are all included in HMD 200 in the second embodiment. However, functions corresponding to at least any one or a part of instruction position detecting portion 55, information detecting portion 67 and input information determining portion 65 as functions included in MFP 100 shown in FIG. 6 in the first embodiment may be included in HMD 200 in the second embodiment.

For example, HMD 200 in the second embodiment may include instruction position detecting portion 261 corresponding only to instruction position detecting portion 55 among position detecting portion 55, information detecting portion 67 and input information determining portion 65 included in MFP 100 in the first embodiment. Further, HMD 200 in the second embodiment may include instruction position detecting portion 261 and information detecting portion 267 each corresponding to instruction position detecting portion 55 and information detecting portion 67 respectively, among position detecting portion 55, information detecting portion 67 and input information determining portion 65 included in MFP 100 in the first embodiment, or may include instruction position detecting portion 261 and input information determining portion 269 each corresponding to instruction position detecting portion 55 and input information determining portion 65 respectively, among position detecting portion 55, information detecting portion 67 and input information determining portion 65 included in MFP 100 in the first embodiment.

Further, HMD 200 in the second embodiment may include information detecting portion 267 corresponding only to information detecting portion 67 among position detecting portion 55, information detecting portion 67 and input information determining portion 65 included in MFP 100 in the first embodiment. Further, HMD 200 in the second embodiment may include information detecting portion 267 and input information determining portion 269 each corresponding to information detecting portion 67 and input information determining portion 65 respectively, among position detecting portion 55, information detecting portion 67 and input information determining portion 65 included in MFP 100 in the first embodiment.

Further, HMD 200 in the second embodiment may include input information determining portion 269 corresponding only to input information determining portion 65 among position detecting portion 55, information detecting portion 67 and input information determining portion 65 included in MFP 100 in the first embodiment.

Although MFP 100 has been described as an example of the data input apparatus in the foregoing embodiment, it is needless to say that the present invention can be understood as a data input method that allows MFP 100 or PC 300 to execute the data input process shown in FIG. 12, and a data input program that allows CPU 111 included in MFP 100 or CPU 301 included in PC 300 to execute the data input method.

Although the present invention has been described and illustrated in detail, it is clearly understood that the same is by way of illustration and example only and is not to be taken by way of limitation, the spirit and scope of the present invention being limited only by the terms of the appended claims.

APPENDIX (1) The data input apparatus according to claim 8, wherein said input information extracting portion extracts the input information on the basis of the data definition information corresponding to the screen displayed in said display unit, every time said screen is displayed in said display unit.

(2) The data input apparatus according to claim 12, wherein said screen arrangement information acquiring portion acquires the screen arrangement information of said screen, every time said screen is displayed in said display unit.

According to this aspect, it is possible to input the data to the data input area which is lastly displayed among a plurality of screens.

(3) The data input apparatus according to claim 13, wherein said setting portion determines a position of said data input area on the basis of the area arrangement information of the data input area included in said screen, every time said screen is displayed in said display unit.

According to this aspect, it is possible to detect the relative position between the data input area and the recording medium included in the screen.

What is claimed is:

1. A data input system comprising:
a data input apparatus; and
an imaging apparatus capable of communicating with said data input apparatus, wherein:
said data input apparatus includes a display to display a screen including a data input area, and a processor;
said imaging apparatus includes a camera to capture an image of a subject which includes (i) the display on which the screen is displayed and (ii) a recording medium, and to output image data of the captured image;
said processor includes a setting portion configured to set data input in the data input area;
said processor included in said data input apparatus or said imaging apparatus further includes an instruction position detecting portion configured to detect, based on a relative position between a display surface of said display and said recording medium both included in the image data output by said camera, an instruction position within said display surface;
said processor included in said data input apparatus or said imaging apparatus further includes an information detecting portion configured to detect information stored in said recording medium included in the image data output by said camera;
said processor included in said data input apparatus or said imaging apparatus further includes an input information extracting portion configured to extract from said detected information, input information that can be input to said data input area; and
said setting portion is configured to, in a case where the instruction position detected by said instruction position detecting portion is a prescribed position, set said extracted input information as data input to said data input area.

2. The data input system according to claim 1, wherein said processor included in said data input apparatus includes said instruction position detecting portion, said information detecting portion, and said input information extracting portion.

3. The data input system according to claim 1, wherein said imaging apparatus includes said instruction position detecting portion and said information detecting portion.

4. A data input apparatus capable of communicating with an imaging apparatus including a camera to capture an image of a subject and output image data of the captured image, the data input apparatus comprising:
a display to display a screen including a data input area, wherein the image of the subject includes (i) the display on which the screen is displayed and (ii) a recording medium, and
a processor,
wherein said processor includes:
a setting portion configured to set data input in the data input area;
an instruction position acquiring portion configured to acquire an instruction position detected within a display surface of said display based on a relative position between the display surface and said recording medium both included in the image data output by said camera;
an information acquiring portion configured to acquire information detected based on said image data and stored in said recording medium;
an input information acquiring portion configured to acquire input information extracted from said acquired information and which can be input to said data input area; and
wherein said setting portion is configured to, in a case where the instruction position acquired by said instruction position acquiring portion is a prescribed position, set said acquired input information as data input to said data input area.

5. The data input apparatus according to claim 4, wherein said processor further includes:
an image data receiving portion configured to receive from said imaging apparatus, the image data output by said camera, and
an instruction position detecting portion configured to detect, based on the relative position between said display surface of said display and said recording medium both included in said received image data, the instruction position within said display surface.

6. The data input apparatus according to claim 5, wherein:
said processor further includes a change detecting portion configured to detect, based on an image output by said camera, change of a shape of said recording medium, and
said instruction position detecting portion is configured to detect said instruction position based on the relative position between said recording medium and said display surface at a point of time when said change of a shape is detected.

7. The data input apparatus according to claim 6, wherein said instruction position detecting portion is configured to detect as said instruction position, a position on which a changed part of the shape of said recording medium is overlapped with said display surface.

8. The data input apparatus according to claim 7, wherein:
said recording medium is rectangle-shaped, and
said instruction position detecting portion is configured to determine as a changed part of the shape, a vertex angle formed by two edges changed from straight line among four edges of said recording medium.

9. The data input apparatus according to claim 5, wherein:
said processor further includes a move detecting portion configured to detect, based on an image output by said camera, change of the relative position between said recording medium and said display surface, and
said instruction position detecting portion is configured to determine said instruction position based on the relative position between said recording medium and said display surface at a point of time when said change of the relative position becomes equal to or less than a prescribed value.

10. The data input apparatus according to claim 9, wherein said instruction position detecting portion is configured to detect as said instruction position, part of an apical end of said recording medium overlapped with said display surface at the point of time when change of the relative position becomes equal to or less than a prescribed value, the apical end being in a direction to which said recording medium moves toward said display surface during the time when the relative position between said recording medium and said display surface is changing.

11. The data input apparatus according to claim 4, wherein said processor further includes:
an image data receiving portion configured to receive from said imaging apparatus, said image data output by said camera, and
an information detecting portion configured to detect, based on said received image data, said information stored in said recording medium.

12. The data input apparatus according to claim 4, wherein said processor further includes an input information extracting portion configured to extract from said information acquired by said information acquiring portion, said input information which can be input to said data input area.

13. The data input apparatus according to claim 12, wherein said input information extracting portion is configured to extract the input information based on data definition information defining data which can be input to a data input area included in said screen.

14. The data input apparatus according to claim 12, wherein:
said prescribed position is within said displayed screen, and
said input information extracting portion is configured to, in a case where said displayed screen includes a plurality of data input areas, extract a plurality of pieces of input information respectively corresponding to each of said plurality of data input areas.

15. The data input apparatus according to claim 4, wherein said prescribed position is within a data input area included in said displayed screen.

16. The data input apparatus according to claim 4, wherein said prescribed position is within said displayed screen.

17. The data input apparatus according to claim 4, wherein:
said processor further includes a screen arrangement information acquiring portion configured to acquire screen arrangement information indicating a position on the display surface of said display, at which a screen displayed on said display is arranged, and
said setting portion is configured to determine a position of the screen displayed in said display, based on said screen arrangement information.

18. The data input apparatus according to claim 4, wherein
said setting portion is configured to determine a position of said data input area in a screen displayed on said display, based on area arrangement information indicating a position in said screen, at which a data input area included in a screen displayed on said display unit is arranged.

19. A data input method performed in a data input system including a data input apparatus and an imaging apparatus capable of communicating with said data input apparatus, wherein:
said data input apparatus includes a display unit to display a screen including a data input area,
said imaging apparatus includes a camera to capture an image of a subject which includes (i) the display on which the screen is displayed and (ii) a recording medium, and to output image data of the captured image, and
the data input method comprises:
acquiring, by one of the data input apparatus and the imaging apparatus, an instruction position detected within a display surface of said display based on a relative position between the display surface and said recording medium both included in the image data output by said camera;
acquiring, by one of the data input apparatus and the imaging apparatus, information detected based on the image data output by said camera and stored in said recording medium;
acquiring, by one of the data input apparatus and the imaging apparatus, input information extracted from said acquired information which can be input to said data input area, and
in a case where the acquired instruction position is a prescribed position, setting, by the data input apparatus, said acquired input information as data input to said data input area.

20. A non-transitory computer-readable recording medium encoded with a data input program executed by a computer controlling a data input apparatus capable of communicating with an imaging apparatus including a camera to capture an image of a subject and output image data of the captured image, wherein said data input apparatus includes a display to display a screen including a data input area, and wherein the image of the subject includes (i) the display on which the screen is displayed and (ii) a recording medium,
wherein the data input program causes said computer to execute functions comprising:
receiving from said imaging apparatus the image data output by said camera;
detecting, based on a relative position between a display surface of said display and said recording medium both included in said received image data, an instruction position within said display surface;
detecting, based on said received image data, information stored in said recording medium;
extracting from said detected information, input information which can be input to said data input area; and setting, in a case where the detected instruction position detected is a prescribed position, setting said extracted input information as data input to said data input area.

* * * * *